United States Patent
Takeuchi et al.

[11] Patent Number: 6,082,900
[45] Date of Patent: Jul. 4, 2000

[54] DYNAMIC PRESSURE PNEUMATIC BEARING STRUCTURE AND METHOD OF MANUFACTURING THE SAME

[75] Inventors: Hisao Takeuchi; Kaoru Murabe; Osamu Komura; Tomoyuki Awazu, all of Itami, Japan

[73] Assignee: Sumitomo Electric Industries, Ltd., Osaka, Japan

[21] Appl. No.: 09/172,000

[22] PCT Filed: Feb. 23, 1998

[86] PCT No.: PCT/JP98/00739

§ 371 Date: Oct. 28, 1998

§ 102(e) Date: Oct. 28, 1998

[87] PCT Pub. No.: WO98/38433

PCT Pub. Date: Sep. 3, 1998

[30] Foreign Application Priority Data

Feb. 28, 1997 [JP] Japan ................................. 9-045985
Feb. 18, 1998 [JP] Japan ................................ 10-035591

[51] Int. Cl.[7] ................................................. F16C 17/02
[52] U.S. Cl. ............................................. 384/115; 384/114
[58] Field of Search ..................................... 384/115, 114, 384/118, 111, 113

[56] References Cited

U.S. PATENT DOCUMENTS

| 4,512,626 | 4/1985 | Kamiya et al. . |
| 5,628,567 | 5/1997 | Murabe et al. . |

FOREIGN PATENT DOCUMENTS

| 54-127044 | 9/1979 | Japan . |
| 58-224324 | 12/1983 | Japan . |
| 61-201916A | 9/1986 | Japan . |
| 2-15726A | 4/1990 | Japan . |
| 2093115A | 4/1990 | Japan . |
| 5001715A | 1/1993 | Japan . |
| 8312639 | 11/1996 | Japan . |
| 9014257A | 1/1997 | Japan . |
| 9144749A | 6/1997 | Japan . |

OTHER PUBLICATIONS

Shinichi Tohgo, "Gas Bearing", published by Kyoritsu Shuppan (1984), pp. 4 to 7, with partial English Translation.
Atsunobu Mori, "About Whirling of Gas Bearing", in "Lubrication" vol. 20, No. 7 (1975) pp. 481–488, with partial English Translation.

*Primary Examiner*—Lenard A. Footland
*Attorney, Agent, or Firm*—W. F. Fasse; W. G. Fasse

[57] ABSTRACT

Provided is a hydrodynamic gas bearing structure which can prevent occurrence of whirl not only in high-speed rotation but also in low-speed rotation, reduces such frequency that a floating rotational frequency in starting or stoppage of rotation increases, and is capable of shifting the floating rotational frequency to a low rotational frequency side. The hydrodynamic gas bearing structure comprises a shaft body (1) and a bearing body (2). A groove (11) is formed on the outer peripheral surface of the shaft body (1). The groove (11) consists of at least two concave parts, whose depths substantially differ from each other, which are formed serially in the circumferential direction, and has a circumferentially asymmetrical shape in a cross section perpendicular to the axis. The circumferential distance a between the intersection point (15) of a line (C) connecting the deepest point (14) of the groove (11) and the center (O) of the shaft body (1) and the outer peripheral line (Q) of the shaft body (1) and one edge (16) of the groove (11) positioned downward an air current (P) generated in rotation in relation to the intersection point (15) is larger than the circumferential distance b between the intersection point (15) and the other edge (17) of the groove (11) positioned upstream the air current (P) in relation to the intersection point (15). The ratio ($d_2/d_1$) of the mean depth $d_2$ of a relatively shallow part of the groove (11) to the mean depth $d_1$ of a relatively deep part of the groove (11) is less than 0.3. The hydrodynamic gas bearing structure is suitable for employment for a rotation driving part of a magnetic recording apparatus or a laser beam printer.

34 Claims, 10 Drawing Sheets

DYNAMIC PRESSURE PNEUMATIC BEARING STRUCTURE AND METHOD OF MANUFACTURING THE SAME

TECHNICAL FIELD

The present invention generally relates to a hydrodynamic gas bearing structure, and more specifically, it relates to a hydrodynamic gas bearing structure supporting a rotator rotating at a high speed and a method of manufacturing the same.

BACKGROUND TECHNIQUE

In recent years, high rotational accuracy is being required to a rotation driving part, such as an optical deflection scanner, for example, of a magnetic recording apparatus or a laser beam printer along with a high rotational speed. In order to rotate a precision motor to which such high rotational speed and high rotational accuracy are required at a higher speed, employment of a gas bearing (hydrodynamic gas bearing) for the rotation driving part is proposed. In the rotation driving part employing this gas bearing, air is forcibly introduced into at least a clearance between a radial gas bearing body and a rotator when the rotator rotates. Thus, the air pressure in the clearance is increased, and the rotator rotates at a high speed through the gas bearing. Thus, maintenance of the rotational accuracy is expected also during high-speed rotation, by employing the gas bearing.

In the aforementioned radial gas bearing, a wedge clearance is formed by eccentricity of a shaft body in the bearing body, as shown in "Gas Bearing" by Shinichi Tohgo, Kyoritsu Shuppan (1984), for example. Pressure is generated when air passes through this wedge clearance since the air is compressed. Thus, it becomes possible to support the shaft body and the bearing body in a non-contact manner.

According to "About Whirl of Gas Bearing" by Atsunobu Mori, pp. 481 to 488, "Lubrication" Vol. 20, No. 7 (1975), however, an unstable phenomenon called "whirl" (H/W) is observed in a cylindrical journal bearing when set in an unloaded state such as the case of supporting a vertical shaft or the like. This phenomenon is such that the shaft is pressed against the bearing surface by centrifugal force to whirl in the interior of the bearing. In the cylindrical journal bearing, the bearing center and the rotation center deviate from each other by a static load to generate pressure in one portion and bring stable rotation. In case of employing the cylindrical journal bearing for a vertical structure, i.e., a structure supporting a vertical shaft or the like, however, the bearing is set in an unloaded state and hence a pressure-producing point changes by disturbance and rotation becomes unstable.

In case of applying the aforementioned hydrodynamic gas bearing to a rotation driving part of a magnetic recording apparatus such as a hard disk driver or a laser printer, the aforementioned unstable factor must be eliminated since the positional accuracy of the rotator is regarded as important.

Accordingly, there is proposed in Japanese Patent Publication No. 4-21844 (corresponds to Japanese Patent Laying-Open No. 58-224324) that generated pressure increases by forming shallow grooves mainly on a side of a shaft body, serving as a rotator, into which gas flows by rotation circumferentially in equal distribution, to improve whirling stability in high-speed rotation, i.e., to prevent a whirl phenomenon.

Further, there is proposed in Japanese Patent Laying-Open No. 8-312639 means of forming at least three grooves extending in the axial direction on a shaft body circumferentially in equal distribution and controlling the groove shape, thereby improving whirl stability in high-speed rotation and preventing a whirl phenomenon.

According to experiments by the inventors, however, it has been proved that there are the following problems in case of forming grooves on a shaft body in accordance with the aforementioned proposals, although a whirl phenomenon in high-speed rotation can be suppressed:

FIG. 11 is a cross-sectional view of a shaft body. As shown in FIG. 11, three portions of grooves 13 are formed on the outer peripheral surface of the shaft body 1. In this case, the shape of the grooves 13 has a laterally symmetrical shape in the circumferential direction of the shaft body 1. The outer peripheral surface of the shaft body 1 has portions which are circumscribed with a circle having a diameter Dout and inscribed with a circle having a diameter Din. The average diameter of the shaft body 1 is shown by Dm.

When forming a hydrodynamic gas bearing structure with the shaft body 1 having such a cross section, it is possible to suppress a whirl phenomenon in high-speed rotation. However, dispersion results in the rotational frequency at the time of rotating/starting the shaft body 1 to shift from such a state that the shaft body and a bearing body are in contact with each other to a non-contact state, or the rotational frequency when the shaft body and the bearing body shift from a non-contact state to a contact state when reducing the rotational speed from a state of stationary rotation of a high speed to stop the rotation, i.e., "floating rotational number". In particular, there has been such a problem that this floating rotational frequency may extremely increase. Thus, there has been such a problem that it is impossible to shift the shaft body and the bearing body from the contact state to the non-contact state at a low rotational frequency but the shaft body and the bearing body are continuously in contact with each other at a relatively high rotational frequency in starting or stoppage of rotation thereby causing abrasion powder. In addition, there has also been such a problem that galling is caused between the shaft body and the bearing body by the abrasion powder.

It has been proved that the aforementioned dispersion of the floating rotational frequency is correlated with the fact that the outer peripheral shape of the shaft body deviates from a complete round as shown in FIG. 11. Namely, it has been proved that the aforementioned dispersion of the floating rotational frequency is large as the out-of-roundness (=(radius of circumscribed circle: Dout/2)−(inscribed circle radius: Din/2)) of the outer peripheral portion of the shaft body 1 excluding the grooves is large. In manufacturing of the shaft body, there has been such a problem that a probability in which a shaft body whose floating rotational frequency is high is manufactured increases, and the manufacturing yield lowers as a result.

An object of the present invention is to provide a hydrodynamic gas bearing structure which is capable of reducing such frequency that a floating rotational frequency increases in starting or stoppage of rotation.

Another object of the present invention is to provide a hydrodynamic gas bearing structure which is capable of shifting a floating rotational frequency in starting or stoppage of rotation to a low rotational frequency side.

Further, still another object of the present invention is to provide a hydrodynamic gas bearing structure which is capable of further effectively preventing an wear phenomenon in starting or stoppage of rotation by reducing such frequency that the floating rotational frequency in starting or stoppage of rotation increases and shifting the floating rotational frequency to a low rotational frequency side.

A further object of the present invention is capable of effectively preventing an wear phenomenon in starting or stoppage of rotation even if the out-of-roundness of a shaft body is large (bad) and to further improve the manufacturing yield of the shaft body in a hydrodynamic gas bearing structure.

DISCLOSURE OF THE INVENTION

A hydrodynamic gas bearing structure according to a first aspect of the present invention comprises a columnar shaft body and a hollow cylindrical bearing body which is opposed to this shaft body while keeping a clearance in the radial direction. When arranging the shaft body and the bearing body so that the respective central axes coincide with each other, a substantially cylindrical clearance is being formed by the outer peripheral surface of the shaft body and the inner peripheral surface of the bearing body. The shaft body has a groove extending in the axial direction on the outer peripheral surface. Here the groove indicates that there is a clear deviation of the outer peripheral surface of the shaft body from a complete round shape toward the central direction, and the outline of the outer peripheral surface after groove formation may not necessarily be a concave shape. Further, it is preferable in this groove that at least an end thereof is connected with the exterior (atmosphere).

As to concave parts such as grinding marks of fine widths in a concave part on a groove forming section in the present invention, it is assumed that each thereof is not included as the groove. Such a concave part of a fine width is shown in an omitted manner also in drawings described in the following. Namely, a concave part regarded as the groove in the present invention does not include any concave part of a fine width detected by a surface roughness meter but includes waviness detectable with an out-of-roundness measurer, and the rough standard of the width of the concave part regarded as the groove in the present invention is that of a degree exceeding 30 µm.

The groove has a circumferentially asymmetrical shape, so that the circumferential distance a between the intersection point of a line connecting the deepest point of the groove and the center of the shaft body and the outer peripheral line of the shaft body before the groove is formed and one edge of the groove positioned downstream an air current generated when either the shaft body or the bearing body rotates in relation to the intersection point becomes larger than the circumferential distance b between the intersection point and the other edge of the groove positioned upstream the air current in relation to the intersection point in a cross section perpendicular to the axis.

The groove defined as described above is concretely described as follows with reference to FIG. 1. As shown in FIG. 1, an intersection point 15 is the intersection point of a line C connecting the deepest point 14 of the groove and the center O of a shaft body and the outer peripheral line Q in a cross section perpendicular to the axis. It is assumed that an air current is generated in the direction shown by arrow P when either the shaft body or a bearing body rotates. A distance a (in the present invention, a circumferential distance is expressed in the magnitude of a central angle corresponding to the distance, as shown in FIG. 1. Namely, an angle γa in FIG. 1) is the circumferential distance between the intersection point 15 and one edge 16 of the groove positioned downstream the air current P in relation to the intersection point 15. A distance b (similarly an angle γb shown in FIG. 1) is the circumferential distance between the intersection point 15 and the other edge 17 of the groove positioned upstream the air current P in relation to the intersection point 15. The groove 11 has an asymmetrical shape in the circumferential distance so that the distance a becomes larger than the distance b in the cross section perpendicular to the axis, i.e., the cross section shown in FIG. 1.

Here, the positions of both edges 16 and 17 of the groove 11 indicate points where the profile line S of the groove 11 in the cross section shown in FIG. 1 intersects with the outer peripheral line Q. Further, the present invention defines the shape of an actual groove in an outline drawing developing the locus of a depth from the outer peripheral surface of the shaft body read from a cross-sectional profile of the groove traced with an out-of-roundness measurer in the circumferential direction. In such a profile of the groove, a fine amplitude waveform in case of working the groove forming its base line is included. In a concave part of the groove defined in the present invention, a concave part along such a fine amplitude waveform is not included. For example, a concave part of a fine width is not included in the groove of the present invention as described above.

Further, the groove consists of at least two concave parts, whose depths substantially differ from each other, which are formed serially in the circumferential direction of the shaft body.

The ratio ($d_2/d_1$) of the mean depth $d_2$ of a relatively shallow part of the groove to the mean depth $d_1$ of a relatively deep part of the groove is less than 0.3.

A hydrodynamic gas bearing structure according to a second aspect of the present invention comprises a columnar shaft body and a hollow cylindrical bearing body which is opposed to this shaft body while keeping a clearance in the radial direction. When arranging the shaft body and the bearing body so that the respective central axes coincide with each other, a substantially cylindrical clearance is being formed by the outer peripheral surface of the shaft body and the inner peripheral surface of the bearing body. The shaft body has a groove extending in the axial direction on the outer peripheral surface. Here the groove indicates that there is clear deviation of the outer peripheral surface of the shaft body from a complete round shape toward the central direction, and the outline of the outer peripheral surface after groove formation may not necessarily be a concave shape.

The groove has a circumferentially asymmetrical shape, so that the circumferential distance a between the intersection point of a line connecting the deepest point of the groove and the center of the shaft body and the outer peripheral line of the shaft body before the groove is formed and one edge of the groove positioned downstream an air current generated when either the shaft body or the bearing body rotates in relation to the intersection point becomes larger than the circumferential distance b between the intersection point and the other edge of the groove positioned upstream the air current in relation to the intersection point in a cross section perpendicular to the axis.

Further, the groove has at least two concave parts, whose depths substantially differ from each other, which are formed serially in the circumferential direction of the shaft body.

The ratio ($W_1/W$) of the width $d_1$ of a relatively deep part of the groove along the circumferential direction to the width W of the overall groove along the circumferential direction is not more than 0.5.

In the aforementioned hydrodynamic gas bearing structures according to the first and second aspects of the present invention, the groove consists of at least two concave parts, whose depths substantially differ from each other, which are formed serially in the circumferential direction of the shaft body. The groove, in which at least two concave parts whose depths thus differ from each other, i.e., a shallow concave part and a deep concave part are thus formed serially by at least two, is referred to as a stepwise groove in the present invention for convenience. Concretely, an exemplary profile of the step wise groove 11 is shown in FIG. 2A.

In the hydrodynamic gas bearing structures according to the first and second aspects of the present invention, the boundary between the relatively deep part and the relatively shallow part is defined as follows in the stepwise groove:

Namely, when drawing from the deepest point (this is referred to as a start point) of the shallower concave part a virtual line having the same depth as the deepest point toward the deeper concave part in the circumferential direction if there are concave parts in two portions in the cross-sectional profile of the groove, the point where this virtual line first intersects with the profile of the groove is assumed to be the boundary between the relatively shallow part and the relatively deep part of the groove.

Describing this with FIG. 2B, the aforementioned start point is shown by 18. When drawing a virtual line 19 parallel to the outer periphery from this start point 18 in a direction shown by arrow, the point first intersecting with the profile of the groove is shown by 20. Therefore, the position of the intersection point 20 shows the boundary between the relatively deep part and the relatively shallow part of the groove.

When there are concave parts in at least three portions in the cross-sectional profile of the groove, the boundary between the relatively deep part and the shallow part of the groove is defined as follows: First, it is assumed that concave parts up to a depth of 1.5 times the shallowest concave part of the groove are included in the shallow concave part of the groove. If the depth of the deepest concave part of the groove is within 1.5 times this in this case, it is assumed that this deepest concave part is excluded from the shallow concave part of the groove. When drawing from the deepest point (this is referred to as a start point) of the shallow concave part thus defined a virtual line having the same depth as the deepest point in the circumferential direction toward the deep concave part of the groove, the point where this virtual line first intersects with the profile of the groove is regarded as the boundary between the relatively deep part and the shallow part of the groove.

Describing this with FIG. 2C, the start point is shown by 21. When drawing a virtual line 22 from this start point 21 in a direction shown by arrow, the point first intersecting with the profile of the groove is shown by 23. Therefore, the position of this intersection point 23 shows the boundary between the relatively deep part and the shallow part of the groove.

In either case, however, it is assumed that a concave part existing within a region up to a position separating by 10% of the width W of the overall groove along the circumferential direction is not an object of the aforementioned start point. FIG. 2B and FIG. 2C show these regions by typically dividing the same with broken lines.

According to the hydrodynamic gas bearing structure of the present invention structured as described above, the following basic effects can be achieved:

(i) Prevention of a wear phenomenon in starting or stoppage of rotation.
(ii) Suppression of dispersion of a floating rotational frequency in starting or stoppage of rotation.
(iii) Improvement of the manufacturing yield of the shaft body in the hydrodynamic gas bearing structure.

According to the hydrodynamic gas bearing structures according to the aforementioned first and second aspects, the following effects can be achieved in addition to the basic effects (i) to (iii):

(iv) Such frequency that the floating rotational frequency in starting or stoppage of rotation is at least 1000 rpm can be reduced.
(v) The floating rotational frequency in starting or stoppage of rotation can be shifted to a lower rotational frequency.
(vi) The phenomenon of wear in starting or stoppage of rotation can be further effectively prevented by the aforementioned (iv) and (v).
(vii) The effects of the aforementioned (iv) and (v) can be exhibited even if the out-of-roundness of the shaft body is large (bad).
(viii) The manufacturing yield of the shaft body in the hydrodynamic gas bearing structure can be further improved by the aforementioned (vii).

In the hydrodynamic gas bearing structures according to the aforementioned first and second aspects, the ratio ($d_1/L$) of the mean depth $d_1$ of the relatively deep part of the groove to the effective length L of the bearing body is preferably at least 0.00005 and not more than 0.002. More preferably, this ratio is at least 0.00015 and not more than 0.0005.

Here, the effective length (referred to as a bearing effective length) L of the bearing body indicates the axial length of a bearing body part opposed to the shaft body having the groove.

A hydrodynamic gas bearing structure according to a third aspect of the present invention comprises a columnar shaft body and a hollow cylindrical bearing body which is opposed to this shaft body while keeping a clearance in the radial direction. When arranging the shaft body and the bearing body so that the respective central axes coincide with each other, a substantially cylindrical clearance is being formed by the outer peripheral surface of the shaft body and the inner peripheral surface of the bearing body. The shaft body has a groove extending in the axial direction on the outer peripheral surface. Here the groove indicates that there is a clear deviation of the outer peripheral surface of the shaft body from a complete round shape toward the central direction, and the outline of the outer peripheral surface after formation of the groove may not necessarily be a concave shape.

The groove has a circumferentially asymmetrical shape, so that the circumferential distance a between the intersection point of a line connecting the deepest point of the groove and the center of the shaft body and the outer peripheral line of the shaft body before the groove is formed and one edge of the groove positioned downstream an air current generated when either the shaft body or the bearing body rotates in relation to the intersection point becomes larger than the circumferential distance b between the intersection point and the other edge of the groove positioned upstream the air current in relation to the intersection point in a cross section perpendicular to the axis.

Further, the groove has inclined surfaces whose inclination angles substantially differ from each other on both circumferential end portions of the shaft body.

The groove defined as described above is referred to as an inclined-surfaced groove in the present invention. The inclined-surfaced groove is such a groove that the profiles of the inclined surfaces extending from edges of the groove to the deepest point are substantially along straight lines connecting the deepest point of the groove and the edges of the groove, i.e., concretely such a groove that the jutting-out quantity of irregularity of the profile of waviness of the inclined surfaces of the groove detectable with an out-of-roundness measurer with respect to the aforementioned straight lines is ±1.5 μm or in a smaller range within ±20% of the maximum depth of the groove. Also in this case, concave parts of fine widths such as grinding marks on the inclined surfaces are not included in the groove as already described.

According to the hydrodynamic gas bearing structure according to the aforementioned third aspect of the present invention, the effects (iv) to (viii) can be achieved in addition to the aforementioned effects (i) to (iii), similarly to the hydrodynamic gas bearing structures according to the first and second aspects.

In the hydrodynamic gas bearing structure according to the aforementioned third aspect of the present invention, the ratio ($W_3/W$) of the width $W_3$ of the inclined surface whose inclination angle is relatively small along the circumferential direction to the width W of the overall groove along the circumferential direction is preferably at least 0.5.

In the hydrodynamic gas bearing structure according to the aforementioned third aspect of the present invention, further, the ratio ($d_{max}/L$) of the maximum depth $d_{max}$ of the groove to the effective length L of the bearing body is preferably at least 0.00005 and not more than 0.001. More preferably, this ratio is at least 0.00015 and not more than 0.0005.

In the hydrodynamic gas bearing structures according to the aforementioned first, second and third aspects of the present invention, the ratio of the mean value of the thickness of the clearance between the shaft body and the bearing body to the radius of the shaft body is preferably at least 0.0025 and not more than 0.002.

Further, either the shaft body or the bearing body forming the hydrodynamic gas bearing structure of the present invention is preferably prepared from ceramics, more preferably from silicon nitride (the main component is $Si_3N_4$).

In a method of manufacturing the hydrodynamic gas bearing structure according to the present invention, a step of forming the groove includes an operation of axially performing grinding on the shaft body with a grinding wheel, thereafter rotating the shaft body by a prescribed angle and performing grinding again, thereby forming the groove having a prescribed shape.

In the method of manufacturing the hydrodynamic gas bearing structure according to the present invention, further, the step of forming the groove comprises a single unit step of performing grinding in a direction parallel to or perpendicular to the axis with a grinding wheel while feeding a grinding table in the axial direction, and includes an operation of forming the groove having a prescribed shape by rotating the shaft body and repeating the single unit step.

In the method of manufacturing the hydrodynamic gas bearing structure according to the present invention, further, the groove may be formed by removing a part of the shaft body with a laser beam.

After performing the aforementioned any step of forming the groove, the groove part of the shaft body and the boundary portion between the groove and the outer peripheral surface of the shaft body may be polished with a grindstone, preferably a grindstone of abrasive grains having grain sizes finer than No. 600 (more preferably grain sizes of Nos. 1000 to 1500). In this case, a method such as polishing with emery paper, polishing with free abrasive grains or the like can be employed.

In the method of manufacturing the hydrodynamic gas bearing structure according to the present invention, further, only a side downstream the air current in the boundary portion between the groove of the shaft and the outer peripheral surface may be polished with emery paper or the like by employing a grindstone, preferably by employing a grindstone of abrasive grains having grain sizes finer than No. 600 (more preferably grain sizes of Nos. 1000 to 1500).

BEST MODES FOR CARRYING OUT THE INVENTION

When structuring a hydrodynamic gas bearing structure while forming a groove extending in the axial direction and having a shape laterally symmetrical in the circumferential direction on the outer peripheral surface of a shaft body, a whirl phenomenon having been disappearing in high-speed rotation due to interaction between the flow of air and the groove may be so generated in low-speed rotation that the shaft body and a bearing body come into contact with each other to cause a wear phenomenon in rotation of a relatively high speed even if fine irregularity of a part excluding the groove exists on the outer peripheral surface of the shaft body, i.e., even if the out-of-roundness of the shaft body is relatively small. Namely, such a phenomenon that whirl which is readily caused in high-speed rotation is caused rather in low-speed rotation is recognized in an ordinary shaft provided with no groove, depending on the relation between the shape of the shaft body and the groove position. This may cause a problem leading to wear.

Figure 1:
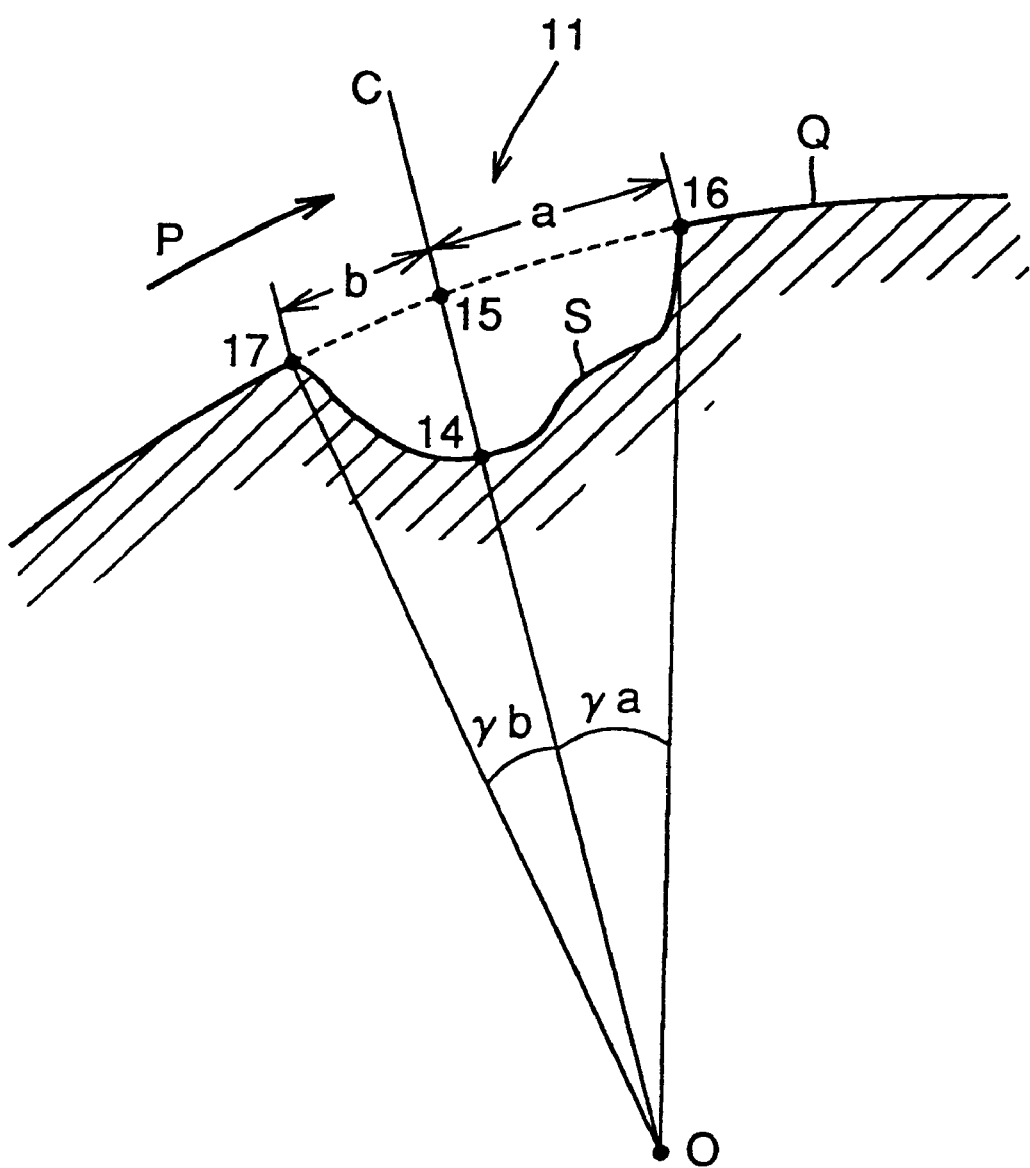
FIG. 1 is a partial cross-sectional view showing the sectional shape of the groove in the hydrodynamic gas bearing structure according to the present invention.
Figure 2A:
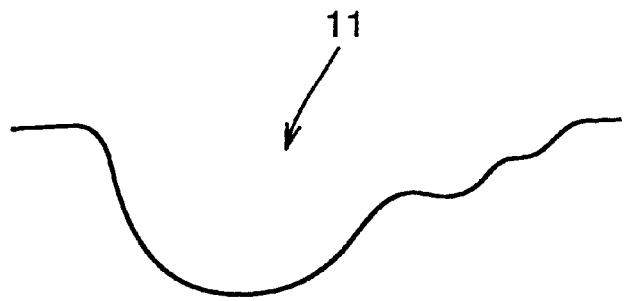
FIG. 2A is a profile of a stepwise groove showing an exemplary groove in the hydrodynamic gas bearing structure according to the first and second aspects of the present invention.
Figure 2B:
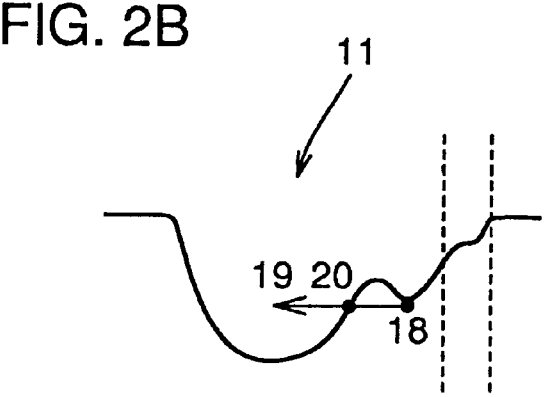
FIG. 2B and FIG. 2C are diagrams employed for defining the boundary between the relatively deep part and the shallow part of the groove.
Figure 2C:
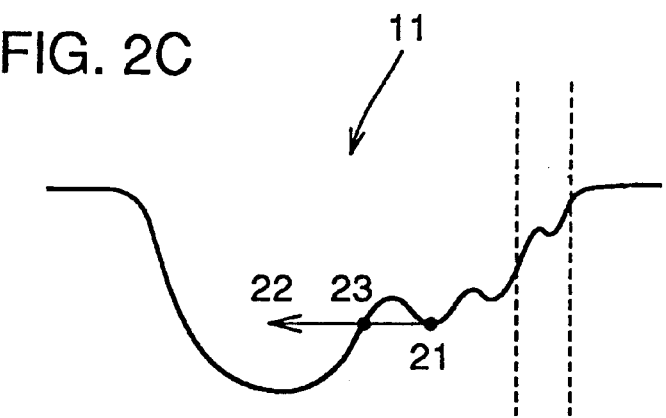

In the hydrodynamic gas bearing structure according to the present invention, on the other hand, a groove having a circumferentially asymmetrical sectional shape is formed. Namely, this groove has such an asymmetrical shape that the ratio of a/b in FIG. 1 exceeds 1, as shown in FIG. 1 as already described. Further, this groove has at least two concave parts whose depths substantially differ from each other, which are formed serially in the circumferential direction of the shaft body in general. In this case, a hydrodynamic gas bearing structure generating gas hydrodynamic is structured by arranging the deep concave part on a side into which gas flows by rotation, i.e., on a side upstream an air current formed by rotation. Thus, occurrence of whirl can be suppressed and the floating rotational frequency can be lowered also in case of rotating the structure in its rotational direction at a relatively low speed. Therefore, it becomes possible to suppress dispersion of the floating rotational frequency and improvement of the manufacturing yield of the shaft body can be attained also when the out-of-roundness of the shaft body material is relatively large. When reversing the rotational direction, the floating rotational frequency increases.

Figure 3:
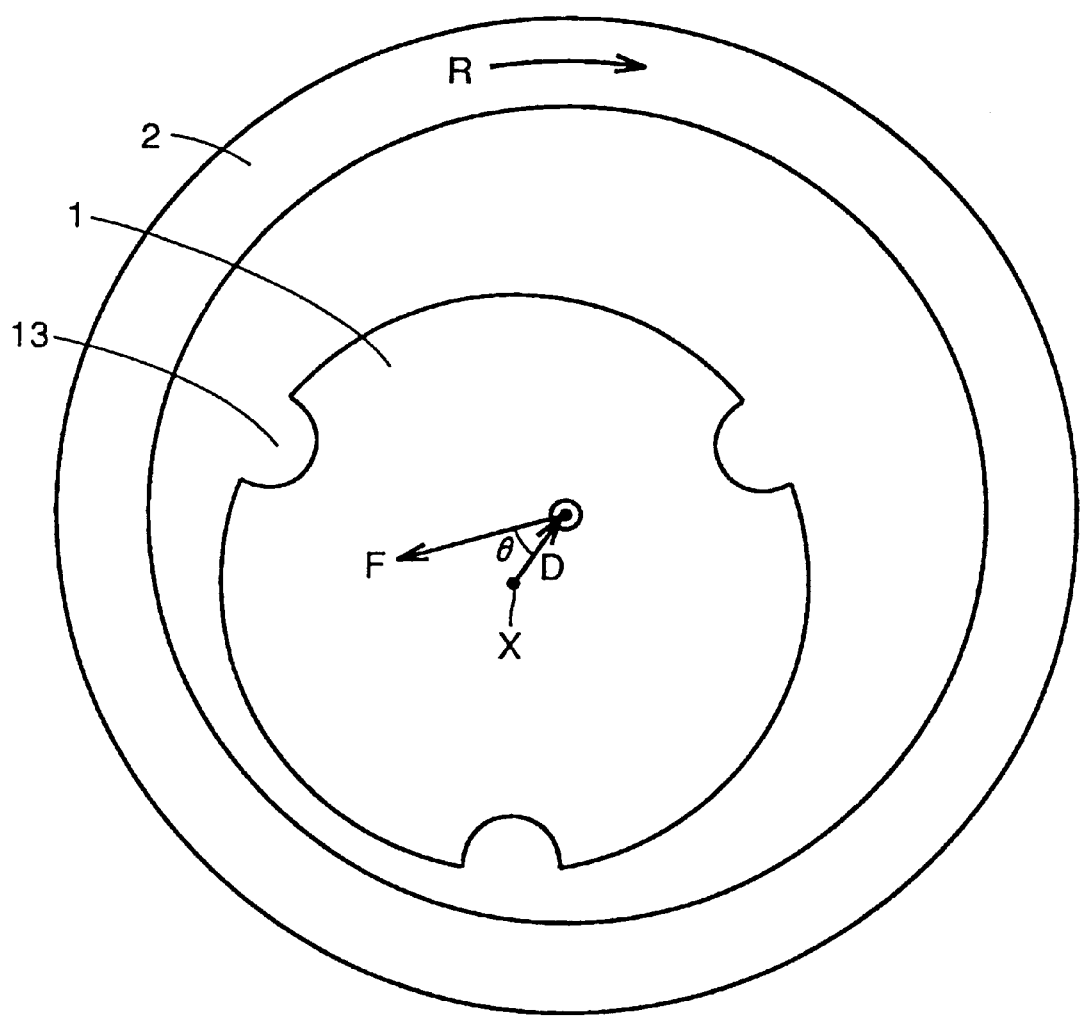
FIG. 3 is a diagram showing a schematic cross section of a hydrodynamic gas bearing structure having grooves of laterally symmetrical sectional shapes for illustrating the cause of dispersion of a floating rotational frequency.

The cause for the fact that the whirl phenomenon having been disappearing in high-speed rotation takes place in low-speed rotation and dispersion is caused in the floating rotational frequency in starting or stoppage of rotation as a result is considered as follows according to numerical calculation by the inventors:

FIG. 3 is a cross-sectional view schematically showing a hydrodynamic gas bearing structure having grooves of a laterally symmetrical sectional shape. Referring to FIG. 3, it is assumed that a shaft body 1 is decentered inside a shaft body 2 and whirls. Grooves 13 having a laterally symmetrical shape in the circumferential direction are formed on the outer peripheral surface of the shaft body 1. The bearing body 2 rotates in a direction shown by arrow R. At this moment, the center (mark ○) of the bearing body 2 is displaced from the center (mark X) of the shaft body 1 in a direction shown by arrow D. At this time, a direction caused by hydrodynamic generated by rotation is shown by arrow F. The angle θ between the displacement direction D and the direction F caused by the hydrodynamic is defined as an eccentric angle. Occurrence of whirl which is the cause of increase of the floating rotational frequency in rotation starting or stoppage mainly depends on the magnitude of the eccentric angle in stable rotation. While it is described in Japanese Patent Publication No. 4-21844 that whirling stability (mainly in high-speed rotation) improves as generated hydrodynamic is high, the inventors consider that the whirling stability is more largely influenced by the eccentric angle and whirling readily takes place when force is generated in front of the displacement direction.

This eccentric angle exerts large influence on the whirling stability even if the same slightly changes. For example, a difference of 1° of the eccentric angle θ has a definitive meaning on presence/absence of whirl occurrence. Namely, even if change of the eccentric angle θ in case of forming grooves having a circumferentially asymmetrical sectional shape is slight, it has an effect of suppressing whirl as a result.

Figure 4:
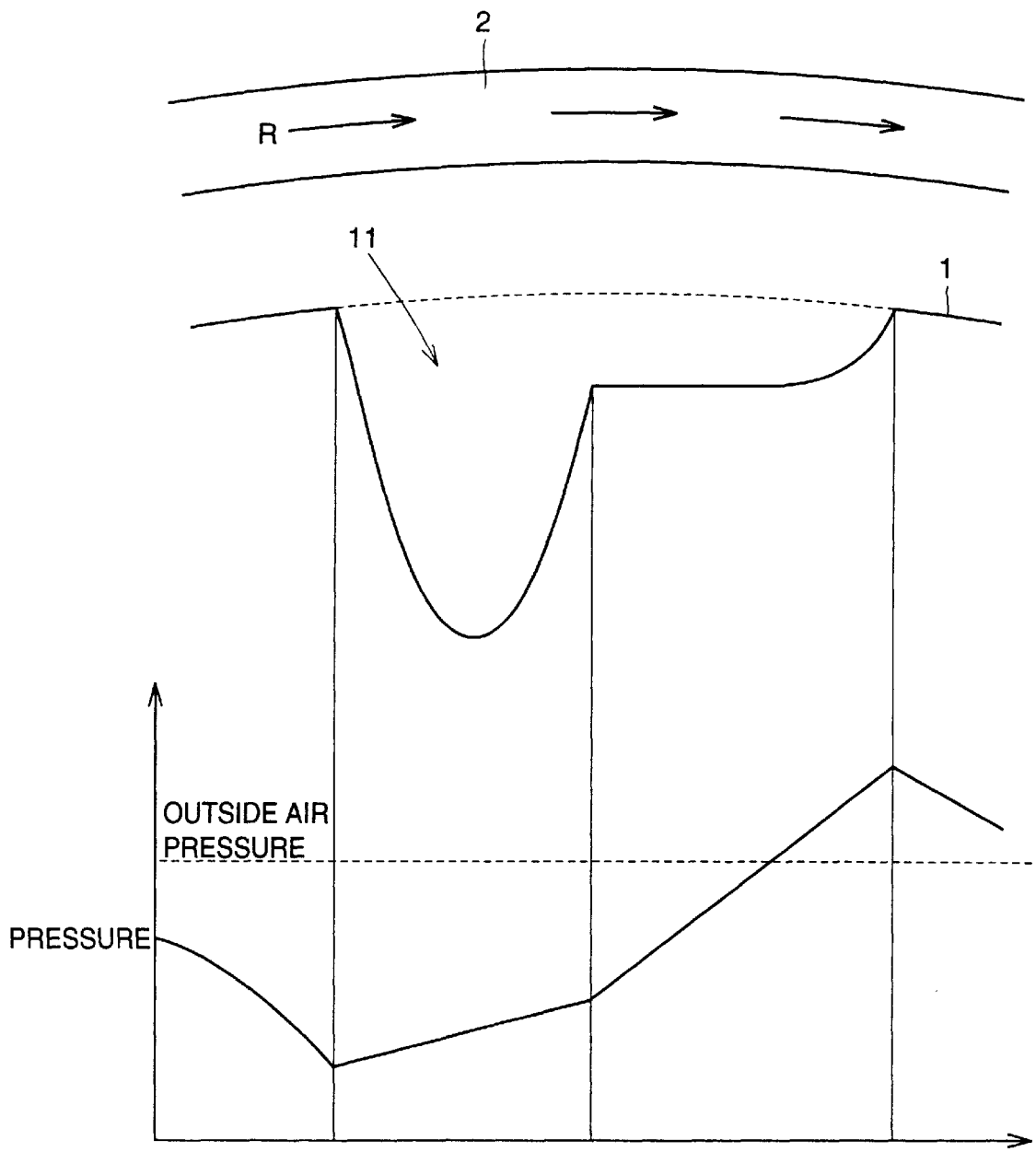
FIG. 4 is a diagram showing the relation between the groove in the hydrodynamic gas bearing structure according to the present invention and pressure brought by the groove.

When forming a groove having a circumferentially asymmetrical sectional shape, the following fact is known according to numerical calculation by the inventors:

FIG. 4 is a diagram showing pressure change in case of forming a groove having a circumferentially asymmetrical sectional shape. As shown on the upper portion of FIG. 4, a groove 11 is formed on the outer peripheral surface of a shaft body 1. A bearing body 2 rotates in a direction shown by arrows R. At this time, pressure changes as shown on the lower portion of FIG. 4. In a deep part of the groove 11, the pressure of the groove part tries to approximate the outside air pressure by an air current in a direction parallel to the axis of the shaft body. The pressure gradient increases in a shallow part of the groove 11 as compared with the deep part. They consider that the whirl phenomenon can be suppressed not only in high-speed rotation but also in low-speed rotation by this effect.

Dispersion of the floating rotational frequency resulting from deviation of a part other than the groove from a complete round is also caused by increase or dispersion of the aforementioned eccentric angle θ. By forming a groove having a circumferentially asymmetrical shape, therefore, dispersion of the floating rotational frequency resulting from deviation from a complete round can also be suppressed as a result.

On the other hand, there is such a problem that rigidity of the shaft body lowers due to the air current along the groove. The groove having a circumferentially asymmetrical sectional shape is higher in suppression effect for a whirl phenomenon than a groove having a circumferentially symmetrical sectional shape, if the same has the same sectional area as the groove having the circumferentially symmetrical sectional shape. Therefore, a desired effect can be attained by forming a relatively shallow groove. Consequently, the rigidity of the shaft body can be improved.

Figure 5:
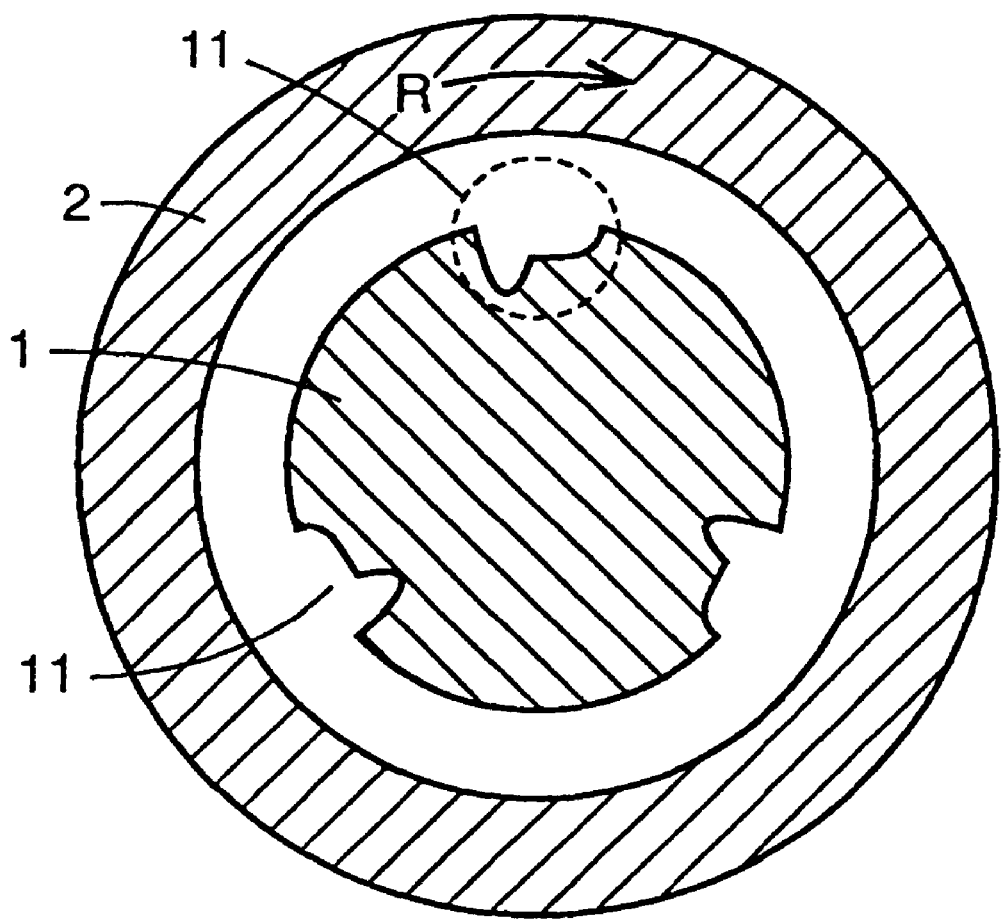
FIG. 5 is a cross-sectional view showing the hydrodynamic gas bearing structure according to the present invention.

FIG. 5 is a cross-sectional view schematically showing the hydrodynamic gas bearing structure according to the present invention. Grooves 11 are formed on the outer peripheral surface of a shaft body 1. A hollow cylindrical bearing body 2 is opposed to the shaft body 1 while keeping a clearance in the radial direction. The bearing body 2 is arranged to rotate in a direction shown by arrow R.

Figure 6:
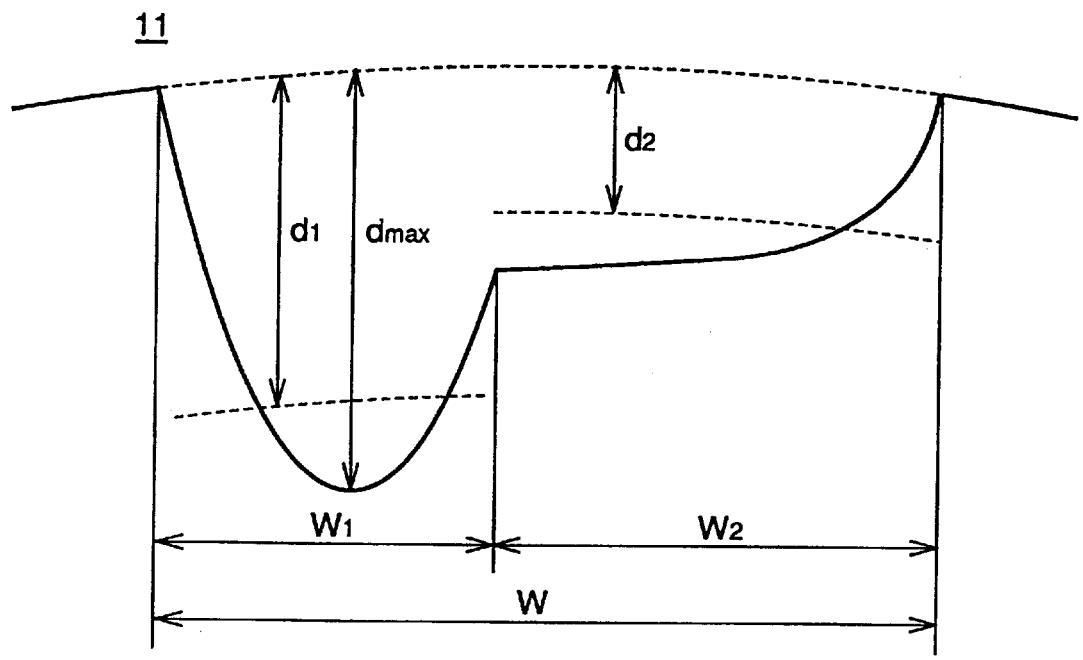
FIG. 6 is a partial sectional view showing the details of the shape of a groove part in the hydrodynamic gas bearing structure according to the first and second aspects of the present invention.
Figure 7:
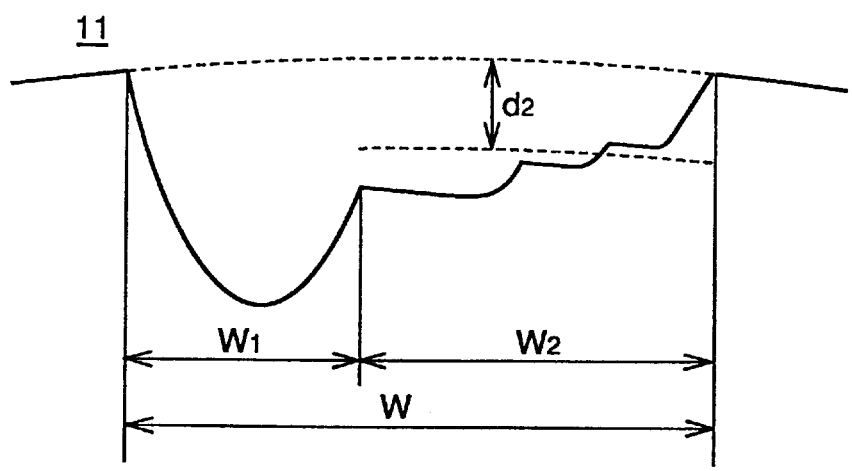
FIG. 7 is a partial sectional view showing the details of the shape of another groove part in the hydrodynamic gas bearing structure according to the first and second aspects of the present invention.

FIG. 6 and FIG. 7 are partial sectional views showing the details of groove parts formed on shaft bodies in the hydrodynamic gas bearing structures according to the first and second aspects of the present invention, i.e., the details of stepwise grooves. As shown in FIG. 6 and FIG. 7, the groove 11 is divided into a relatively deep part and a relatively shallow part of the groove, in accordance with the aforementioned definition of the boundary. Namely, the groove width (the total width of the groove) W is divided into the groove width $W_1$ of the relatively deep part of the groove and the groove width $W_2$ of the relatively shallow part of the groove by the boundary. The mean depth $d_1$ of the relatively deep part of the groove indicates the mean depth of the profile of the groove in the region of the groove width $W_1$. The mean depth $d_2$ of the relatively shallow part of the groove indicates the mean depth of the profile of the groove in the region of the groove width $W_2$. The maximum depth $d_{max}$ of the groove indicates the maximum depth in the region of the groove width $W_1$. The stepwise groove 11 has a shape provided with two stages of steps as shown in FIG. 6. While the steps of the groove are not restricted to two stages as shown in FIG. 6, the same are divided into the relatively deep part and the relatively shallow part of the groove in accordance with the definition of the boundary as shown in FIG. 7, if the same are at least three stages.

In the hydrodynamic gas bearing structure according to the first aspect of the present invention, the groove 11 consists of at least two concave parts, whose depths substantially differ from each other, which are formed serially in the circumferential direction of the shaft body as shown in FIG. 6 or FIG. 7, and the ratio ($d_2/d_1$) of the mean depth $d_2$ of the relatively shallow part of the groove to the mean depth $d_1$ of the relatively deep part of the groove is less than 0.3.

In the hydrodynamic gas bearing structure according to the second aspect of the present invention, the groove 11 consists of at least two concave parts, whose depths substantially differ from each other, which are formed serially in the circumferential direction of the shaft body as shown in FIG. 6 or FIG. 7, and the ratio ($W_1/W$) of the width $W_1$ of the relatively deep part of the groove along the circumferential direction to the width W of the overall groove along the circumferential direction is not more than 0.5.

In the hydrodynamic gas bearing structure according to the first aspect of the present invention, the ratio ($d_2/d_1$) of the mean depth $d_2$ of the relatively shallow part of the groove to the mean depth $d_1$ of the relatively deep part of the groove is less than 0.3, whereby not only the aforementioned effects (i) to (viii) can be achieved but rotational anisotropy can be increased while reduction of the rigidity of the shaft body can be made small.

In the hydrodynamic gas bearing structure according to the second aspect of the present invention, not only the aforementioned effects (i) to (viii) can be achieved but rotational anisotropy can be increased while reduction of the rigidity of the shaft body can be lowly suppressed by rendering the ratio ($W_1/W$) of the width $W_1$ of the relatively deep part of the groove along the circumferential direction to the width W of the overall groove 11 along the circumferential direction not more than 0.5.

Figure 9A:
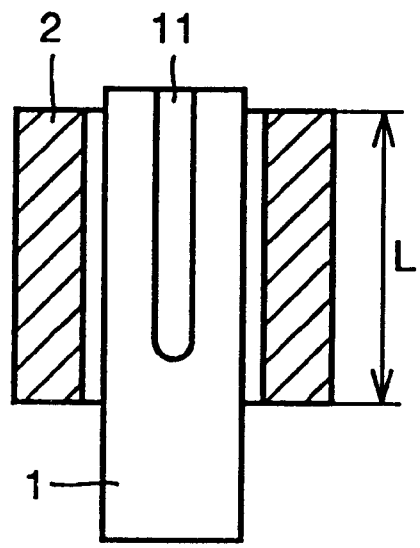
FIGS. 9A and 9B are schematic partial longitudinal sectional views employed for defining a bearing effective length in the hydrodynamic gas bearing structure according to the present invention.
Figure 9B:
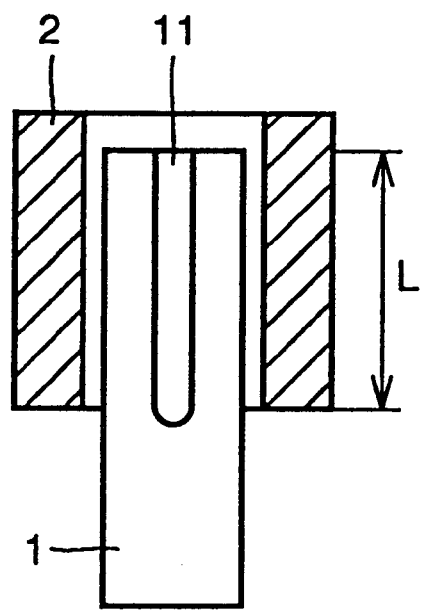

It is preferable that the ratio ($d_1/L$) of the mean depth $d_1$ of the relatively deep part of the groove 11 to the bearing effective length L is at least 0.00005 and not more than 0.002, in view of controlling the air current along the groove. If this ratio is less than 0.00005, the effect of suppressing occurrence of whirl in high-speed rotation lowers. If this ratio exceeds 0.002, reduction of the rigidity of the shaft body is remarkable and the floating rotational frequency increases, while vibration in high-speed rotation tends to increase. Here, the bearing effective length is the length of the bearing body part opposed to the shaft body as shown in FIG. 9A and FIG. 9B, and means the length L of the bearing body part to which generation of hydrodynamic can be expected.

It is more preferable that the ratio ($d_1/L$) of the mean depth $d_1$ of the relatively deep part of the groove 11 to the bearing effective length L is at least 0.00015 and not more than 0.0005.

Figure 8:
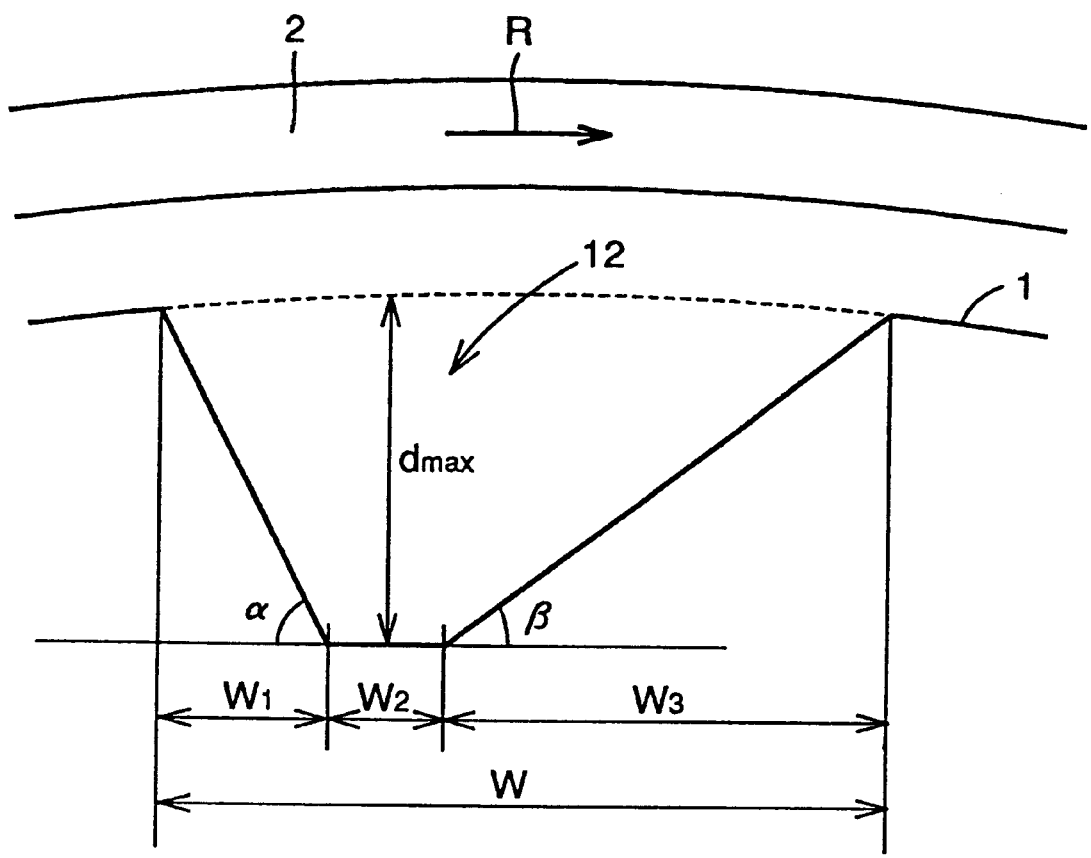
FIG. 8 is a partial sectional view showing the details of the shape of a groove part in the hydrodynamic gas bearing structure according to the third aspect of the present invention.

FIG. 8 is a partial sectional view showing a groove part in the hydrodynamic gas bearing structure according to the third aspect of the present invention. As already described, a concave part of a fine width-amplitude is excluded in this sectional profile. A groove 12 is formed on a shaft body 1. Inclined surfaces whose inclination angles α and β substantially differ from each other are formed on both circumferential end portions of the groove 12. A bearing body 2 is a hollow cylindrical one which is opposed to the shaft body 1 while keeping a clearance in the radial direction. This bearing body 2 rotates in a direction shown by arrow R with respect to the shaft body 1. By increasing the width $W_3$ of the inclined surface (the width of the part whose inclination angle β is small) beyond the width $W_1$ of the inclined surface (the width of the part whose inclination angle α is large), not only the aforementioned effects (i) to (viii) can be achieved but the floating rotational frequency in the rotational direction shown by arrow R can be lowly suppressed, i.e., rotational anisotropy can be controlled.

The ratio ($d_{max}/L$) of the maximum depth $d_{max}$ of the groove to the bearing effective length L is preferably at least 0.00005 and not more than 0.001, in view of controlling the air current along the groove. The effect of suppressing occurrence of whirl in high-speed rotation lowers if this ratio is less than 0.00005, while the rigidity lowers and the floating rotational frequency increases while vibration in high-speed rotation tends to increase if the same exceeds 0.001.

It is more preferable that the ratio ($d_{max}/L$) of the maximum depth $d_{max}$ to the bearing effective length L is at least 0.00015 and not more than 0.0005.

It is preferable that the ratio ($W_3/W$) of the width $W_3$ of the inclined surface whose inclination angle β is relatively small along the circumferential direction to the width W of the overall groove 12 along the circumferential direction is at least 0.5. By rendering this ratio at least 0.5, not only rotational anisotropy can be increased but also reduction of the rigidity of the shaft body can be lowly suppressed since the sectional area of the groove reduces.

In general, it is known that the rigidity is high and whirl hardly takes place as the mean value of the thickness of the clearance is small in a bearing structure of a complete round. This is similar also in a bearing structure having a groove such as that of the present invention. When the ratio of the mean value of the thickness of the clearance between the shaft body and the bearing body to the radius of the shaft body exceeds 0.002, whirl readily takes place in high-speed rotation. If this ratio is less than 0.00025, the shaft body and the bearing body readily come into contact with each other, and influence by thermal expansion cannot be neglected either. In this case, further, there is also such a problem that the manufacturing cost rises since working of extremely high accuracy is necessary for manufacturing of the shaft body. Here, the mean value of the thickness of the clearance means the mean value of the thickness of the clearance between the shaft body and the bearing body (the value in the radial direction) in case of assuming that the cross section of the outer peripheral portion of the shaft body excluding the groove is circumference having the mean radius.

The shaft body or the bearing body forming the hydrodynamic gas bearing structure according to the present invention is preferably prepared from ceramics. The ceramics is higher in wear resistance as compared with metals, and attackability with respect to a counter member to be in contact is low. Therefore, wear or seizure hardly takes place between the bearing body and the shaft body also when the floating rotational frequency is relatively high. Silicon nitride, alumina or the like can be listed as an example of such ceramics. Further, since ceramics generally has small specific gravity, there is also such an advantage that whirl (H/W) is hardly generated when used as the bearing body, since the weight can be reduced.

The step of forming the groove on the shaft body in the hydrodynamic gas bearing structure of the present invention is preferably carried out with a grinding wheel. According to the method of forming the groove with the grinding wheel, it is possible to form a groove of high accuracy at a low cost. The grinding direction may be a parallel direction to the axis, or a perpendicular direction.

As the step of forming the groove on the shaft body in the hydrodynamic gas bearing structure of the present invention, the groove may be formed by removing a part of the shaft body with a YAG laser, an excimer laser or the like. In this case, it becomes possible to finely control the groove shape.

In case of working the groove on the shaft body with the grinding stone, it is possible to remove a local unworked part by performing postworking with emery paper, for causing no dropped part at the time of contact with the bearing body. In case of forming the groove by laser beam machining, deposits by the laser beam machining can be removed by the emery paper.

In the boundary portion between the groove and the outer peripheral surface, only an outlet side of the gas may be polished with abrasive grains finer than No. 600, e.g., emery paper. By thus polishing only a portion close to the outlet for the gas, the groove having a circumferentially asymmetrical shape can be readily worked. It is also possible to employ polishing with free abrasive grains in place of the emery paper. When there is the aforementioned unworked part or deposits by laser beam machining, it is effective to perform the minimum working also on an inlet part, for selectively polishing the outlet part.

EXAMPLE 1

A shaft body consisting of a silicon nitride (the main component is $Si_3N_4$) sintered body whose diameter is 10 mm was prepared. A bearing body was so prepared that the mean value of the thickness of a clearance between the shaft body and the bearing body was 3.5 $\mu$m. The total weight of a rotator including the bearing body consisting of the silicon nitride sintered body was 70 g. The bearing effective length L (see FIG. 9A and FIG. 9B) of a hydrodynamic gas bearing structure thus structured as shown in FIG. 5 was 20 mm. Grooves were formed on the shaft body by three in the circumferential direction at regular intervals to investigate rotational behavior. As to the working accuracy (out-of-roundness) of the parts forming the bearing structure, that of the shaft body was about 0.08 $\mu$m, and that of the bearing body was about 0.4 $\mu$m. The bearing body was rotated with respect to the shaft body. The bearing body was floated with a permanent magnet as to the thrust direction.

Concretely, samples 1-A, 1-B and 1-C were prepared as shown in Table 1.

Figure 10:
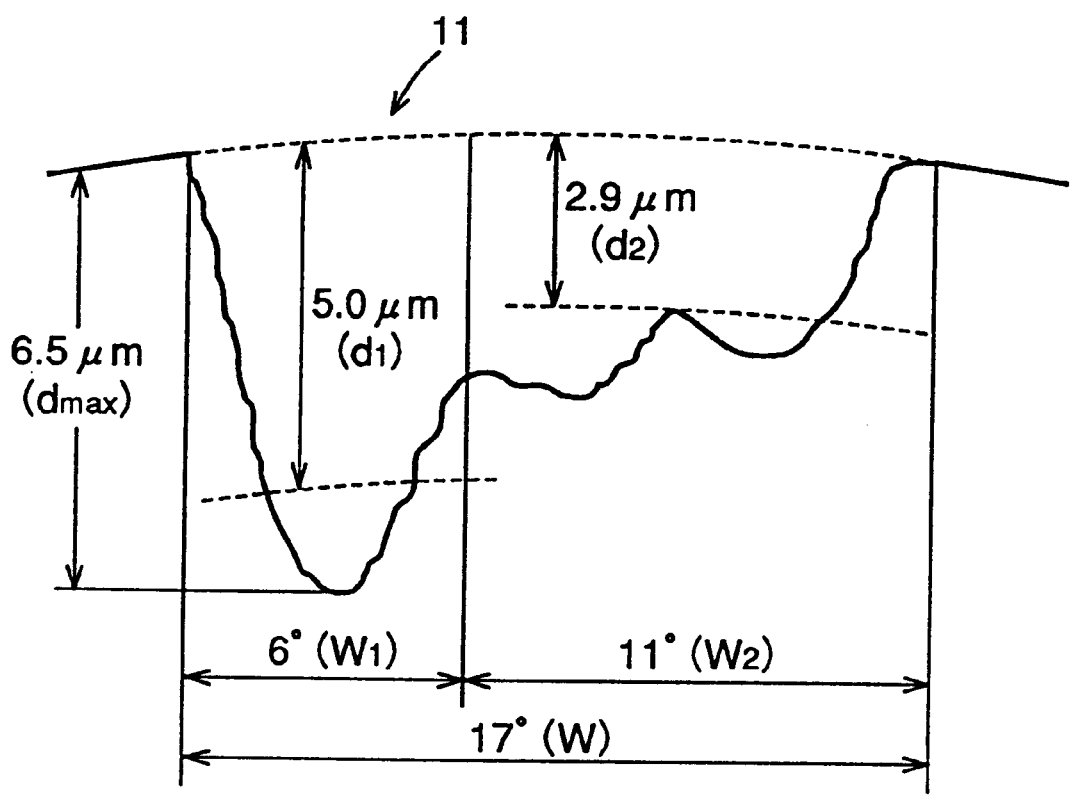
FIG. 10 is a partial sectional view showing the shape of a groove formed in a sample 1-A of Example 1.
Figure 11:
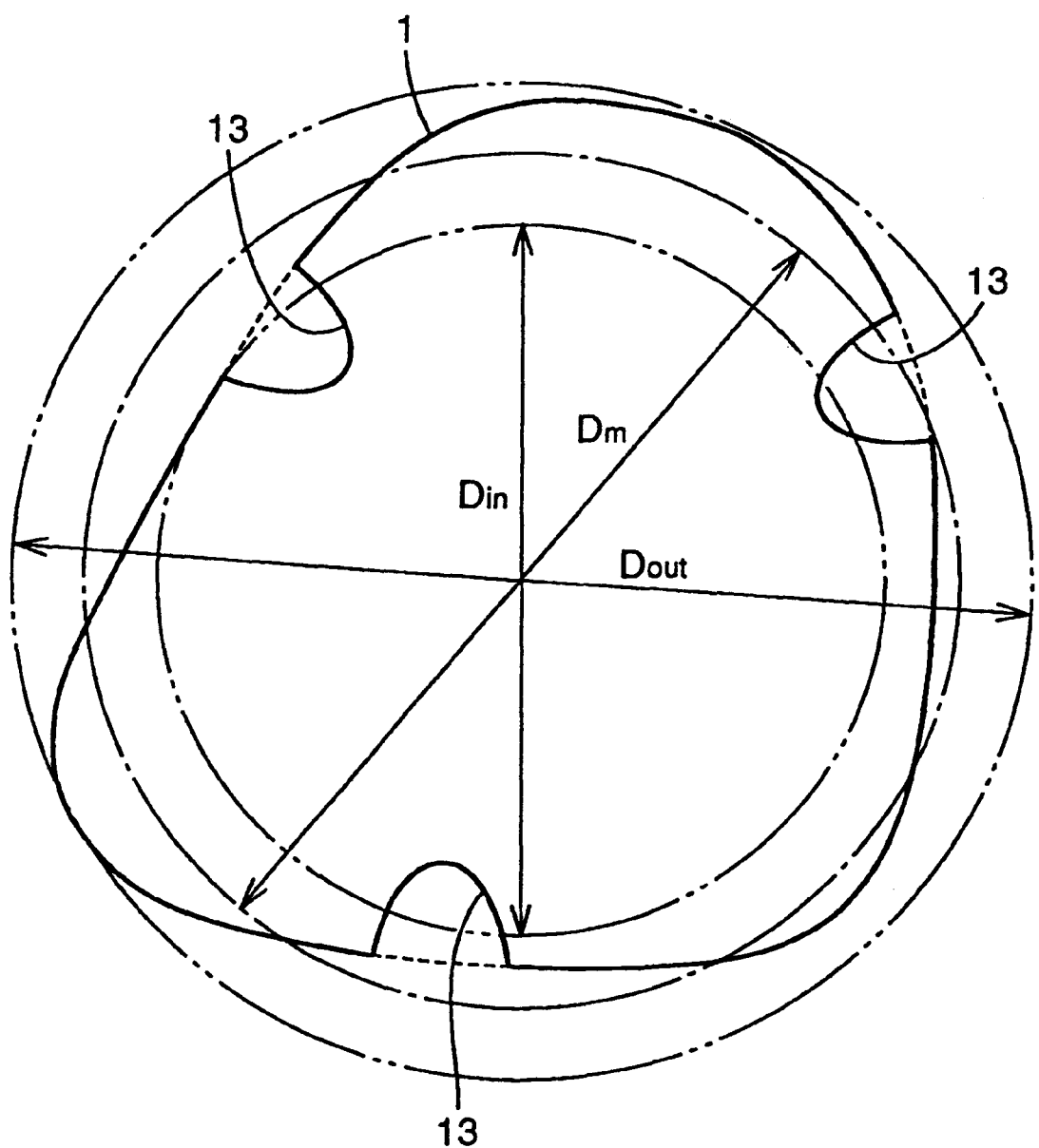
FIG. 11 is a cross-sectional view of a conventional shaft body.

In the sample 1-A, a groove such as that shown in FIG. 6 was formed on a shaft body of 10 mm in diameter by performing the following working: First, the groove was formed on the shaft body by performing grinding in a direction parallel to the axis once in a depth of cut of 6 $\mu$m with a grindstone having a flat grinding surface, thereafter rotating the shaft body by 4° in the circumferential direction and performing grinding once in a depth of cut of 3 $\mu$m, and further rotating the shaft body by 4° in the circumferential direction and performing grinding in a depth of cut of 3 $\mu$m again. When the shape of the groove was measured after the grinding, a groove having a circumferentially asymmetrical sectional shape shown in FIG. 10 was obtained. Since working was made in the circumferential direction in units of 4°, a part between respective worked grooves was slightly shallow. The maximum depth $d_{max}$ of the part ground in the depth of cut of 6 $\mu$m was 6.5 $\mu$m, and the maximum depth of the part ground in the depth of cut of 3 $\mu$m was 3.5 $\mu$m. The width $W_1$ of the part ground in the depth of cut of 6 $\mu$m was about 6°, and the width $W_2$ of the part ground in the depth of cut of 3 $\mu$m was about 11°. The mean depth $d_1$ of the part ground in the depth of cut of 6 $\mu$m was 5.0 $\mu$m, and the mean depth $d_2$ of the part ground in the depth of cut of 3 $\mu$m was 2.9 $\mu$m. Here the depth means a deviation from a complete round. Thus, it was possible to obtain a shaft body provided with grooves of a shape such as that shown in FIG. 6 in three portions circumferentially in equal distribution.

As comparative example, grooves were formed on the shaft body in the sample 1-B by performing grinding three times in a depth of cut of 6 $\mu$m similarly to the sample 1-A. When the shape of the grooves was similarly measured, the width of the grooves was 18°, the maximum depth was 6.5 $\mu$m, the mean depth was 5.1 $\mu$m, and the sectional shape of the grooves was laterally symmetrical in the circumferential direction. Thus, it was possible to obtain a shaft body formed with the grooves in three portions circumferentially in equal distribution.

The sample 1-C formed with no grooves was also prepared as another comparative example.

In columns of "$d_2/d_1<0.3$" and "$W_1/W \leq 0.5$" in Table 1, marks "○" indicate satisfaction of the conditions and marks "X" indicate unsatisfaction of the conditions.

As rotational behavior, presence/absence of whirl (H/W) in high-speed rotation (20000 rpm) and the rotational frequency (floating rotational frequency) when the bearing body and the shaft body came into contact with each other at the time of gradually reducing the rotational frequency from high-speed rotation were measured as to each of clockwise rotation and counterclockwise rotation. 12 members were prepared as the sample number as to each of the samples 1-A, 1-B and 1-C, for calculating the maximum value and the mean value of the floating rotational frequency. Table 2 shows measurement results of these.

In the sample 1-B formed with the grooves having the circumferentially symmetrical sectional shape, it was possible to suppress occurrence of whirl in high-speed rotation, while the sample exhibited no rotational anisotropy when the rotational frequency lowered, both the maximum value and the mean value were large in a prescribed rotational direction, in clockwise rotation in this case, and dispersion thereof was also large. In the sample 1-A formed with the grooves having the circumferentially asymmetrical sectional shape and satisfying $W_1/W<0.5$, on the other hand, not only was it possible to suppress occurrence of whirl in high-speed rotation but also both the mean value and the maximum value of the floating rotational frequency in a prescribed rotational direction (clockwise rotation) were at small levels of not more than 1000 rpm, and dispersion thereof was also small and was at a level causing no wear in starting or stoppage of rotation.

TABLE 1

| | | Groove Outline | | | Deep Part | | | Shallow Part | | | | |
| | Effective | | | Groove | Maximum | Mean | Depth Ratio | Groove | Maximum | Mean | | |
| Sample Name | Bearing Length (mm) | Groove Number (number) | Groove Width W (Degree) | Width $W_1$ (Degree) | Depth $d_{max}$ ($\mu$m) | Depth $d_1$ ($\mu$m) | $d_1$/Effective Length — | Width $W_2$ (Degree) | Depth — ($\mu$m) | Depth $d_2$ ($\mu$m) | $d_2/d_1$ <0.3 | $W_1/W$ ≦0.5 |
|---|---|---|---|---|---|---|---|---|---|---|---|---|
| 1-A | 20 | 3 | 17 | 6 | 6.5 | 5.0 | 0.000250 | 11 | 3.5 | 2.9 | x | o |
| 1-B | 20 | 3 | 17 | 17 | 6.5 | 5.1 | 0.000255 | — | — | — | x | x |
| 1-C | 20 | 0 | — | — | — | — | — | — | — | — | x | x |
| 2-A | 20 | 3 | 17 | 6 | 6.6 | 5.2 | 0.000260 | 11 | 3.6 | 3.0 | x | o |
| 2-B | 20 | 3 | 17 | 17 | 6.7 | 5.3 | 0.000265 | — | — | — | x | x |

TABLE 2

| | in High-Speed Rotation | | Floating Rotational Frequency (rpm) | | | | | |
| | Presence/Absence of H/W | | Mean Value | | Maximum Value | | Correspondence | |
| Sample Name | Clockwise Rotation | Counterclockwise Rotation | Clockwise Rotation | Counterclockwise Rotation | Clockwise Rotation | Counterclockwise Rotation | to Present Invention | Remarks |
|---|---|---|---|---|---|---|---|---|
| 1-A | no | no | 220 | 4100 | 310 | 7200 | o | |
| 1-B | no | no | 850 | 750 | 1750 | 1600 | x | |
| 1-C | yes | yes | 190 | 200 | 250 | 320 | x | |
| 2-A | no | no | 420 | 2500 | 980 | 5500 | o | out-of-roundness: 0.2 $\mu$m |
| 2-B | no | no | 1600 | 1700 | 3200 | 3900 | x | out-of-roundness: 0.2 $\mu$m | o: Present Invention
x: Comparative Example

EXAMPLE 2

Grooves such as that shown in FIG. 6 were formed on the outer peripheral surfaces of shaft bodies similarly to Example 1 by employing silicon nitride sintered bodies of about 0.2 $\mu$m in out-of-roundness as the materials for the shaft bodies. The details of the shapes of the grooves are shown in samples 2-A and 2-B (the sample 2-B is of a symmetrical shape) in Table 1. Hydrodynamic gas bearing structures were structured similarly to Example 1 by employing the shaft bodies thus formed with the grooves, for measuring rotational behavior thereof. The measurement results are shown in Table 2.

Thus, when the out-of-roundness of the shaft body was relatively large as compared with Example 1, the mean value as well as the maximum value of the floating rotational frequency increased and dispersion thereof was also remarkable when grooves having a circumferentially symmetrical sectional shape were formed on the shaft body (sample 2-B). When grooves having a circumferentially asymmetrical sectional shape were formed on the shaft body (sample 2-A), on the other hand, it exhibited rotational anisotropy, both the maximum value and the mean value of the floating rotational frequency in a prescribed rotational direction (clockwise rotation) were lowly suppressed at levels of not more than 1000 rpm, and it was possible to lowly suppress dispersion thereof too even if the out-of-roundness of the shaft body was relatively large. This means that it leads to improvement of the manufacturing yield of the shaft body.

EXAMPLE 3

Grooves of a shape such as that shown in FIG. 6 were formed by employing materials for the shaft bodies similar to the sample 1-A of Example 1. The depth of cut was set at 1 $\mu$m or 0.5 $\mu$m when forming relatively shallow parts of the grooves. When forming relatively deep parts of the grooves, the depths of cut were set at 50 $\mu$m (sample 3-A in Table 3), 15 $\mu$m (sample 3-B), 9 $\mu$m (sample 3-C), 4 $\mu$m (sample 3-D), 3 $\mu$m (sample 3-E), 2 $\mu$m (sample 3-F), 1.2 $\mu$m (sample 3-G) and 0.9 $\mu$m (sample 3-H) respectively for performing grinding on the shaft body materials and forming the grooves. Hydrodynamic gas bearing structures were structured similarly to Example 1 by employing the shaft bodies thus obtained, for performing measurement of rotational behavior.

When the depths of cut were shallow as described above, rotation angles in cutting were reduced. Concretely, the grooves were formed by performing grinding four times in units of 2° in the circumferential direction when the depth of cut was not more than 2 $\mu$m, and performing grinding 12 times in units of 0.7° when the depth of cut was not more than 1.2 $\mu$m.

The details of the groove shapes and measurement results of the rotational behavior are shown in Table 3 and Table 4 respectively.

In columns of "$d_2/d_1$<0.3" and "$W_1/W$≦0.5" in Table 3, marks "o" indicate satisfaction of the conditions and marks "X" indicate unsatisfaction of the conditions. In the column of remarks of Table 4, grooving is shown by numerical values of depths of successively cut concave parts.

It is understood that the mean values and the maximum values of the floating rotational frequencies in prescribed rotation (clockwise rotation in this case) are small and dispersion thereof is also small in the samples satisfying the condition of $d_2/d_1$<0.3 and/or $W_1/W$≦0.5. In the sample 3-A whose ratio of di/effective length exceeded 0.002, however, the floating rotational frequency tended to increase due to rigidity reduction. Further, it was proved that the effect of suppressing occurrence of whirl in high-speed rotation reduces in the sample 3-H whose ratio of di/effective length is less than 0.00005, although it is possible to reduce the mean value and the maximum value of the floating rotational frequency and it is also possible to reduce the dispersion thereof. From the aforementioned results, it is understood that the floating rotational frequency in a prescribed rotational direction (clockwise rotation in this case) can be shifted toward a low rotational frequency side, the mean value of the floating rotational frequency can be suppressed to not more than 1000 rpm, and it is more preferably possible to also render the maximum value thereof not more than 1000 rpm by forming grooves having a circumferentially asymmetrical sectional shape and further forming the grooves to satisfy the condition of $d_2/d_1 < 0.3$ and/or $W_1/W \leq 0.5$.

body materials with an excimer laser and thereafter polishing the groove parts with emery paper. Thus, grooves having shapes shown in samples 4-A and 4-B of Table 3 were formed on the shaft bodies.

Hydrodynamic gas bearing structures were structured as shown in FIG. 5 with the shaft bodies prepared as described above, and rotational behavior was investigated similarly to Example 1. However, the rotational frequency in high-speed rotation was set at 16000 rpm. The working accuracy (out-of-roundness) of the shaft bodies was about 0.2 μm, and the working accuracy of the bearing bodies was about 0.6 μm. The sample number was set at 10 as to each of the

TABLE 3

| | | Groove Outline | | Groove | Deep Part | | | Shallow part | | | | |
| | Effective | Groove | Groove | Width | Maximum | Mean | Depth Ratio | Groove | Maximum | Mean | | |
| Sample Name | Bearing Length | Number (number) | Width W (Degree) | $W_1$ (Degree) | Depth $d_{max}$ (μm) | Depth $d_1$ (μm) | $d_1$/Effective Length | Width $W_2$ (Degree) | Depth — (μm) | Depth $d_2$ (μm) | $d_2/d_1$ <0.3 | $W_1/W$ ≦0.5 |
|---|---|---|---|---|---|---|---|---|---|---|---|---|
| 3-A | 20 | 3 | 27 | 14 | 51.0 | 42.0 | 0.002100 | 11 | 1.2 | 0.9 | ○ | x |
| 3-B | 20 | 3 | 21 | 10 | 15.7 | 12.8 | 0.000640 | 11 | 1.3 | 1.0 | ○ | ○ |
| 3-C | 20 | 3 | 18 | 7 | 9.6 | 8.0 | 0.000400 | 11 | 1.2 | 1.0 | ○ | ○ |
| 3-D | 20 | 3 | 17 | 6 | 4.5 | 3.8 | 0.000190 | 11 | 1.3 | 1.1 | x | ○ |
| 3-E | 20 | 3 | 17 | 6 | 3.4 | 2.5 | 0.000125 | 11 | 1.4 | 1.1 | x | ○ |
| 3-F | 20 | 3 | 17 | 6 | 2.3 | 1.9 | 0.000095 | 11 | 1.1 | 1.0 | x | ○ |
| 3-G | 20 | 3 | 17 | 6 | 1.6 | 1.4 | 0.000070 | 11 | 1.2 | 0.9 | x | ○ |
| 3-H | 20 | 3 | 17 | 6 | 1.1 | 0.9 | 0.000045 | 11 | 0.7 | 0.5 | x | ○ |
| 4-A | 20 | 3 | 10 | 2 | 30.0 | 28.0 | 0.000800 | 8 | 3.0 | 2.8 | ○ | ○ |
| 4-B | 20 | 3 | 10 | 2 | 15.0 | 14.0 | 0.000400 | 8 | 3.0 | 2.7 | ○ | ○ |

TABLE 4

| | in High-Speed Rotation | | Floating Rotational Frequency (rpm) | | | | Correspondence | |
| | Presence/Absence of H/W | | Mean Value | | Maximum Value | | to Present | |
| Sample Name | Clockwise Rotation | Counterclockwise Rotation | Clockwise Rotation | Counterclockwise Rotation | Clockwise Rotation | Counterclockwise Rotation | Invention | Remarks |
|---|---|---|---|---|---|---|---|---|
| 3-A | no | no | 2500 | 2400 | 3500 | 3300 | x | 50–1–1 |
| 3-B | no | no | 750 | 2500 | 1200 | 3600 | ○ | 15–1–1 |
| 3-C | no | no | 350 | 3500 | 540 | 5100 | ○ | 9–1–1 |
| 3-D | no | no | 200 | 5500 | 250 | 7700 | ○ | 4–1–1 |
| 3-E | no | no | 200 | 2500 | 260 | 5100 | ○ | 3–1–1 |
| 3-F | no | yes | 200 | 1300 | 260 | 2500 | ○ | 2–1–1 |
| 3-G | no | yes | 200 | 510 | 240 | 960 | ○ | 1.2–1–1 |
| 3-H | yes | yes | 200 | 220 | 240 | 270 | x | 0.9–0.5–0.5 |
| 4-A | no | no | 650 | 2500 | 930 | 4100 | ○ | 30–3–3 |
| 4-B | no | no | 350 | 3000 | 560 | 4800 | ○ | 15–3–3 |

○: Present Invention
x: Comparative Example

EXAMPLE 4

Shaft body materials consisting of silicon nitride sintered bodies of 20 mm in diameter were prepared. Bearing bodies were structured to have 35 mm as the bearing effective length L (see FIG. 9A and FIG. 9B) with respect to these shaft bodies. The mean value of the thickness of clearances between the shaft bodies and the bearing bodies was set at 6 μm. The total weight of rotators including the bearing bodies consisting of the silicon nitride sintered bodies was 150 g.

Grooves of a shape such as that shown in FIG. 6 were formed on the outer peripheral surfaces of the shaft bodies in three portions circumferentially in equal distribution. As a method of forming the grooves, it was performed by partially removing the outer peripheral surfaces of the shaft samples 4-A and 4-B. The bearing bodies were floated with permanent magnets as to the thrust direction. Measurement results of the rotational behavior are shown in Table 4.

EXAMPLE 5

Grooves having shapes such as that shown in FIG. 6 were formed on the outer peripheral surfaces of shaft bodies by forming relatively deep parts of the grooves by performing grinding in a depth of cut of 6 μm similarly to the sample 1-A of Example 1 while performing grinding by setting the depths of cut at 5.5 μm (sample 5-A in Table 5), 5 μm (sample 5-B), 4 μm (sample 5-C), 2 μm (sample 5-D) and 1 μm (sample 5-E) in working of relatively shallow parts. Hydrodynamic gas bearing structures were structured similarly to Example 1 by employing the shaft bodies thus prepared, and rotational behavior was measured. When the depth of cut was 1 μm, the grooves were formed by performing grinding four times in units of 2° in the circumferential direction. Table 5 shows the details of the groove shapes, and Table 6 shows the measurement results of the rotational behavior. Table 5 and Table 6 also show the details of the groove shapes of the samples 1-A and 1-B and the measurement results of the rotational behavior respectively.

As obvious from Table 5 and Table 6, anisotropy of the rotational direction was remarkable as the ratio ($d_2/d_1$) of the mean depth $d_2$ of the relatively shallow parts of the grooves to the mean depth $d_1$ of the relatively deep parts of the grooves was small, not only the mean value and the maximum value of the floating rotational frequency in clockwise rotation were low but also it was possible to render these values not more than 1000 rpm, and dispersion thereof was also small.

In columns of "$d_2/d_1<0.3$" and "$W_1/W≦0.5$" in Table 5, marks "o" indicate satisfaction of the conditions and marks "X" indicate unsatisfaction of the conditions. In the column of remarks of Table 6, grooving is shown by numerical values of depths of successively cut concave parts.

Table 8 shows the measurement result of the rotational behavior. Table 7 and Table 8 also show the details of the groove shape and the measurement result of the rotational behavior of the sample 1-A.

As obvious from Table 7 and Table 8, it is understood that dispersion of the floating rotational frequency is small as the ratio ($W_1/W$) of the circumferential width $W_1$ of the relatively deep parts of the grooves to the circumferential width W of the overall grooves is small. In columns of "$d_2/d_1<0.3$" and "$W_1/W≦0.5$" in Table 7, marks "o" indicate satisfaction of the conditions and marks "X" indicate unsatisfaction of the conditions. In the column of remarks of Table 8, grooving is shown by numerical values of depths of successively cut concave parts.

EXAMPLE 7

Grooves having the shape shown in FIG. 7 were formed on shaft bodies in three portions circumferentially in equal distribution respectively by grinding shaft body materials consisting of silicon nitride sintered bodies of 5 mm in diameter and 0.11 μm in out-of-roundness five times in order

TABLE 5

| | | | Deep Part | | | | Shallow Part | | | | | |
|---|---|---|---|---|---|---|---|---|---|---|---|---|
| | Effective | Groove Outline | Groove | Maximum | Mean | Depth Ratio | Groove | Maximum | Mean | Depth | | |
| Sample Name | Bearing Length (mm) | Groove Number (number) | Groove Width W (Degree) | Width $W_1$ (Degree) | Depth $d_{max}$ (μm) | Depth $d_1$ (μm) | $d_1$/Effective Length — | Width $W_2$ (Degree) | Depth — (μm) | Depth $d_2$ (μm) | Ratio $d_2/d_1$ — | $d_2/d_1$ <0.3 | $W_1/W$ ≦0.5 |
| 1-B | 20 | 3 | 17 | 17 | 6.5 | 5.1 | 0.000255 | — | — | — | 1.000 | x | x |
| 5-A | 20 | 3 | 17 | 6 | 6.5 | 5.0 | 0.000250 | 11 | 6.0 | 4.7 | 0.940 | x | o |
| 5-B | 20 | 3 | 17 | 6 | 6.6 | 5.1 | 0.000255 | 11 | 5.4 | 4.4 | 0.863 | x | o |
| 5-C | 20 | 3 | 17 | 6 | 6.7 | 5.3 | 0.000265 | 11 | 4.4 | 3.6 | 0.679 | x | o |
| 1-A | 20 | 3 | 17 | 6 | 6.5 | 5.0 | 0.000250 | 11 | 3.5 | 2.9 | 0.580 | x | o |
| 5-D | 20 | 3 | 17 | 6 | 6.3 | 4.9 | 0.000245 | 11 | 2.4 | 2.0 | 0.408 | x | o |
| 5-E | 20 | 3 | 17 | 6 | 6.5 | 4.9 | 0.000245 | 11 | 1.3 | 1.0 | 0.204 | o | o |

TABLE 6

| | in High-Speed Rotation | | Floating Rotational Frequency (rpm) | | | | | |
|---|---|---|---|---|---|---|---|---|
| | Presence/Absence of H/W | | Mean Value | | Maximum Value | | Correspondence | |
| Sample Name | Clockwise Rotation | Counterclockwise Rotation | Clockwise Rotation | Counterclockwise Rotation | Clockwise Rotation | Counterclockwise Rotation | to Present Invention | Remarks |
| 1-B | no | no | 850 | 750 | 1750 | 1600 | x | 6-6-6 |
| 5-A | no | no | 700 | 850 | 1400 | 1550 | o | 6-5.5-55 |
| 5-B | no | no | 450 | 1500 | 750 | 2200 | o | 6-5-5 |
| 5-C | no | no | 300 | 1900 | 500 | 4000 | o | 6-4-4 |
| 1-A | no | no | 220 | 4100 | 310 | 7200 | o | 6-3-3 |
| 5-D | no | no | 210 | 5100 | 290 | 7200 | o | 6-2-2 |
| 5-E | no | no | 210 | 6000 | 260 | 8500 | o | 6-1-1 | o: Present Invention
x: Comparative Example

EXAMPLE 6

Grooves having a shape similar to that shown in FIG. 6 were formed on a shaft body similarly to Example 1. The grooves of the shape shown in a sample 6-A in Table 7 were formed by performing grinding four times while setting the depth of cut at 6 μm, 6 μm, 6 μm and 3 μm and displacing the positions by 4° in the circumferential direction.

A hydrodynamic gas bearing structure was structured with the shaft body having the grooves prepared in this manner similarly to Example 1, and rotational behavior was measured. Table 7 shows the details of the groove shape and of depths of cut of 3 μm, 1 μm, 1 μm, 1 μm and 1 μm in units of 2° and five times in order of 3 μm, 3 μm, 3 μm, 3 μm and 1 pm. Thus, grooves having shapes shown in samples 7-A and 7-B in Table 7 were formed on the shaft bodies. Hydrodynamic gas bearing structures were structured as shown in FIG. 5 with the shaft bodies prepared in the aforementioned manner, and a rotation test was made with the mean value of 2.2 μm of the thicknesses of clearances and a bearing effective length L (see FIG. 9A and FIG. 9B) of 12 mm. The total weight of rotators including bearing bodies consisting of silicon nitride sintered bodies was 20 g.

However, the rotational frequency in high-speed rotation was set at 30000 rpm. The details of the groove shapes are shown in Table 7, and the measurement results of rotation behavior are shown in Table 8. As obvious from the results of Table 7 and Table 8, it is understood that dispersion of the floating rotational frequency is small as the ratio ($W_1/W$) of the circumferential width $W_1$ of relatively deep parts of the grooves to the circumferential width $W$ of the overall grooves is small.

surface of a shaft body material with a YAG laser. At this time, the overall groove parts were polished with emery paper (#600). The sample thus prepared is shown as a sample 8-J in Table 9. This sample was employed for performing a measurement test on rotational behavior similarly to the above.

Table 9 shows the details of the shapes of the groove parts, and Table 10 shows the measurement results of the rotational behavior.

TABLE 7

| | | | | Deep Part | | | | Shallow Part | | | | | |
|---|---|---|---|---|---|---|---|---|---|---|---|---|---|
| | Effective | Groove Outline | | Groove | Maximum | Mean | Width | Groove | Maximum | Mean | Depth | | |
| Sample Name | Bearing Length (mm) | Groove Number (number) | Groove Width W (Degree) | Width $W_1$ (Degree) | Depth $d_{max}$ (μm) | Depth $d_1$ (μm) | Ratio $W_1/W$ — | Width $W_2$ (Degree) | Depth — (μm) | Depth $d_2$ (μm) | Ratio $d_2/d_1$ — | $d_2/d_1$ <0.3 | $W_1/W$ ≦0.5 |
| 6-A | 20 | 3 | 21 | 15 | 6.6 | 5.1 | 0.714 | 6 | 5.4 | 4.4 | 0.863 | x | x |
| 1-A | 20 | 3 | 17 | 6 | 6.5 | 5.0 | 0.353 | 11 | 3.5 | 2.9 | 0.580 | x | o |
| 7-A | 12 | 2 | 16 | 4 | 3.3 | 2.8 | 0.250 | 12 | 1.2 | 1.0 | 0.357 | x | o |
| 7-B | 12 | 2 | 16 | 12 | 3.4 | 2.9 | 0.750 | 4 | 1.3 | 1.1 | 0.379 | x | x |

TABLE 8

| | in High-Speed Rotation | | Floating Rotational Frequency (rpm) | | | | | |
|---|---|---|---|---|---|---|---|---|
| | Presence/Absence of H/W | | Mean Value | | Maximum Value | | Correspondence | |
| Sample Name | Clockwise Rotation | Counterclockwise Rotation | Clockwise Rotation | Counterclockwise Rotation | Clockwise Rotation | Counterclockwise Rotation | to Present Invention | Remarks |
| 6-A | no | no | 650 | 850 | 1400 | 1550 | x | 6-6-6-3 |
| 1-A | no | nO | 220 | 4100 | 310 | 7200 | o | 6-3-3 |
| 7-A | no | no | 550 | 3500 | 870 | 6000 | o | 3-1-1-1-1 |
| 7-B | no | no | 1200 | 1400 | 2500 | 2500 | x | 3-3-3-3-1 | o: Present Invention
x: Comparative Example

EXAMPLE 8

Grooves of a shape such as that shown in FIG. 8 were formed on shaft body materials consisting of silicon nitride sintered bodies of 12 mm in diameter and 0.1 μm in out-of-roundness. The grooves were formed on the outer peripheral surfaces of the shaft body materials in four portions circumferentially in equal distribution while controlling the shapes of inclined parts (parts corresponding to the inclination angle α) on air current inlet sides and inclined parts (parts corresponding to the inclination angle β) on outlet sides. Thus, shaft bodies having nine types of groove shapes were prepared. The details of the groove shapes are shown in samples 8-A to 8-I in Table 9.

A bearing body was combined with respect to each shaft body prepared in this manner so that the mean value of the thickness of a clearance was 4 μm, for performing measurement of rotational behavior (the bearing effective length L (see FIG. 9A and FIG. 9B) was 22 mm, the rotational frequency was 18000 rpm) similarly to Example 1.

Further, grooves of a shape such as that shown in FIG. 8 were formed by removing parts of the outer peripheral As obvious from Table 9 and Table 10, it is understood that the mean value as well as the maximum value of the floating rotational frequency are small and dispersion thereof is also small by forming grooves having inclined surfaces whose inclination angles substantially differ from each other on both circumferential end portions and arranging the same so that the inclined surfaces having the larger inclination angle are on air current inlet sides, i.e., when in clockwise rotation in Table 10. In the sample 8-A in which the ratio of $d_{max}$/effective length exceeded 0.001, however, the floating rotational frequency tended to increase due to rigidity reduction. In the sample 8-H in which the ratio of $d_{max}$/effective length was less than 0.00005, further, the effect of suppressing occurrence of whirl in high-speed rotation tended to lower although the mean value as well as the maximum value of the floating rotational frequency reduced.

In columns of "$W_3>W_1$" in Table 9, marks "o" indicate satisfaction of the conditions and marks "X" indicate unsatisfaction of the conditions.

TABLE 9

| Sample Name | Effective Bearing Length (mm) | Groove Outline Number (Number) | Groove Outline Depth (Degree) | Maximum Depth $d_{max}$ (μm) | Tapered Part Shape Width (μm) $W_1$ (Degree) | $W_2$ (Degree) | $W_3$ (Degree) | Deep Part Maximum Depth Ratio $d_{max}$/Effective Length | Shallow Part Tapered Width Ratio $W_3/W$ | $W_3 > W_1$ | Remarks |
|---|---|---|---|---|---|---|---|---|---|---|---|
| 8-A | 22 | 4 | 16 | 25.0 | 2 | 4 | 10 | 0.001136 | 0.6 | ○ | Grinding |
| 8-B | 22 | 4 | 16 | 13.0 | 2 | 4 | 10 | 0.000591 | 0.6 | ○ | Grinding |
| 8-C | 22 | 4 | 16 | 8.0 | 2 | 4 | 10 | 0.000364 | 0.6 | ○ | Grinding |
| 8-D | 22 | 4 | 16 | 8.0 | 4 | 4 | 8 | 0.000364 | 0.5 | ○ | Grinding |
| 8-E | 22 | 4 | 16 | 8.0 | 6 | 4 | 6 | 0.000364 | 0.4 | x | Grinding |
| 8-F | 22 | 4 | 16 | 8.0 | 2 | 2 | 12 | 0.000364 | 0.8 | ○ | Grinding |
| 8-G | 22 | 4 | 16 | 3.0 | 2 | 4 | 10 | 0.000136 | 0.6 | ○ | Grinding |
| 8-H | 22 | 4 | 16 | 1.0 | 2 | 4 | 10 | 0.000045 | 0.6 | ○ | Grinding |
| 8-I | 22 | 4 | 16 | 8.0 | 2 | 8 | 6 | 0.000364 | 0.4 | ○ | Grinding |
| 8-J | 22 | 4 | 16 | 5.0 | 2 | 4 | 10 | 0.000227 | 0.6 | ○ | Laser + Emery Paper |
| 11-A | 20 | 4 | 16 | 6.0 | 2 | 4 | 10 | 0.000300 | 0.6 | ○ | Transverse Grinding |
| 11-B | 20 | 4 | 16 | 6.0 | 2 | 4 | 10 | 0.000300 | 0.6 | ○ | Laser + Emery Paper |

TABLE 10

| Sample Name | in High-Speed Rotation Presence/Absence of H/W Clockwise Rotation | Counterclockwise Rotation | Floating Rotational Frequency (rpm) Mean Value Clockwise Rotation | Counterclockwise Rotation | Maximum Value Clockwise Rotation | Counterclockwise Rotation | Correspondence to Present Invention |
|---|---|---|---|---|---|---|---|
| 8-A | no | no | 1700 | 1900 | 2500 | 2800 | x |
| 8-B | no | no | 650 | 2500 | 890 | 3300 | ○ |
| 8-C | no | no | 310 | 3200 | 510 | 5200 | ○ |
| 8-D | no | no | 360 | 2600 | 800 | 4200 | ○ |
| 8-E | no | no | 890 | 960 | 1600 | 1900 | x |
| 8-F | no | no | 290 | 2600 | 360 | 4100 | ○ |
| 8-G | no | no | 340 | 1300 | 650 | 3700 | ○ |
| 8-H | yes | yes | 600 | 780 | 890 | 950 | x |
| 8-I | no | no | 550 | 3300 | 660 | 4300 | ○ |
| 8-J | no | no | 290 | 3300 | 460 | 5600 | ○ |
| 11-A | no | no | 350 | 3300 | 550 | 4700 | ○ |
| 11-B | no | no | 450 | 2800 | 660 | 4300 | ○ |

○: Present Invention
x: Comparative Example

EXAMPLE 9

The same ones as the sample 1-A in Example 1 were employed as shaft bodies, and a measurement test on rotational behavior similar to Example 1 was made with bearing bodies whose inner diameters differed from each other. In each test, the mean values (={(inner diameter of bearing body)−(outer diameter of shaft body)}/2) were 0.8 μm (sample 9-A in Table 11), 1.5 μm (sample 9-B), 3.0 μm (sample 1-A), 4.0 μm (sample 9-C), 6.0 μm (sample 9-D) and 12.0 μm (sample 9-E) respectively. Table 11 shows the details of the groove shapes, and Table 12 shows the measurement results of the rotational behavior. When the mean value of the clearance was 0.8 μm, the shaft body and the bearing body came into contact with each other, and rotation was difficult.

As obvious from Table 11 and Table 12, it was possible to suppress occurrence of whirl by controlling the mean value of the thicknesses of the clearances between the shaft bodies and the bearing bodies.

In columns of "$d_2/d_1 < 0.3$" and "$W_1/W \leq 0.5$" in Table 11, marks "○" indicate satisfaction of the conditions and marks "X" indicate unsatisfaction of the conditions. In the column of remarks of Table 12, grooving is shown by numerical values of depths of successively cut concave parts.

TABLE 11

| Sample Name | Effective Bearing Length (mm) | Groove Outline Groove Number (number) | Groove Outline Groove Width W (Degree) | Clearance Mean Clearance ($\mu$m) | Clearance Radial Ratio Cr/rad | Deep Part Groove Width $W_1$ (Degree) | Deep Part Maximum Depth $d_{max}$ ($\mu$m) | Deep Part Mean Depth $d_1$ ($\mu$m) | Shallow Part Groove Width $W_2$ (Degree) | Shallow Part Maximum Depth ($\mu$m) | Shallow Part Mean Depth $d_2$ ($\mu$m) | $d_2/d_1$ <0.3 | $W_1/W$ $\leq$0.3 |
|---|---|---|---|---|---|---|---|---|---|---|---|---|---|
| 9-A | 20 | 3 | 17 | 0.8 | 0.000160 | 6 | 6.5 | 5.0 | 11 | 3.5 | 2.9 | x | o |
| 9-B | 20 | 3 | 17 | 1.5 | 0.000300 | 6 | 6.5 | 5.0 | 11 | 3.5 | 2.9 | x | o |
| 1-A | 20 | 3 | 17 | 3 | 0.000600 | 6 | 6.5 | 5.0 | 11 | 3.5 | 2.9 | x | o |
| 9-C | 20 | 3 | 17 | 4 | 0.000800 | 6 | 6.5 | 5.0 | 11 | 3.5 | 2.9 | x | o |
| 9-D | 20 | 3 | 17 | 6 | 0.001200 | 6 | 6.5 | 5.0 | 11 | 3.5 | 2.9 | x | o |
| 9-E | 20 | 3 | 17 | 12 | 0.002400 | 6 | 6.5 | 5.0 | 11 | 3.5 | 2.9 | x | o |

TABLE 12

| Sample Name | in High-Speed Rotation Presence/Absence of H/W Clockwise Rotation | in High-Speed Rotation Presence/Absence of H/W Counterclockwise Rotation | Floating Rotational Frequency (rpm) Mean Value Clockwise Rotation | Floating Rotational Frequency (rpm) Mean Value Counterclockwise Rotation | Floating Rotational Frequency (rpm) Maximum Value Clockwise Rotation | Floating Rotational Frequency (rpm) Maximum Value Counterclockwise Rotation | Correspondence to Present Invention | Remarks |
|---|---|---|---|---|---|---|---|---|
| 9-A | — | — | — | — | — | — | x | 6-3-3 |
| 9-B | no | no | 190 | 3200 | 250 | 4500 | o | 6-3-3 |
| 1-A | no | no | 220 | 4100 | 310 | 7200 | o | 6-3-3 |
| 9-C | no | no | 300 | 4500 | 460 | 7200 | o | 6-3-3 |
| 9-D | no | yes | 800 | — | 1500 | — | o | 6-3-3 |
| 9-E | yes | yes | — | — | — | — | x | 6-3-3 | o: Present Invention
x: Comparative Example

EXAMPLE 10

Hydrodynamic gas bearing structures were structured as shown in FIG. 5 by employing shaft bodies of 12 mm in diameter and bearing bodies so arranged that the mean values of clearances were 4 $\mu$m with respect to the shaft bodies. Grooves having shapes such as those shown in FIG. 6 and FIG. 8 were formed on the outer peripheral surfaces of the shaft bodies circumferentially in equal distribution. The details of the shapes of the grooves were set to satisfy the limitation item of $d_2/d_1$<0.3 or $W_3$>$W_1$. Three types of a silicon nitride sintered body, an alumina sintered body and a steel product were employed as the materials for the shaft bodies and the bearing bodies. The dynamic gas bearing structures were structured by employing the shaft bodies and the bearing bodies prepared from these three types of materials, and a measurement test for rotational behavior was performed. Samples whose floating rotational frequencies were about 1000 rpm were sorted out, and a rotation and stop test was repeatedly performed. While it was impossible to recognize a wear phenomenon in the hydrodynamic gas bearing structures structured by employing the shaft bodies and the bearing bodies consisting of silicon nitride sintered bodies and alumina sintered bodies even if a rotation stop test of 10000 times was performed, a wear phenomenon was recognized in that employing the shaft body and the bearing body prepared from steel products after performing a rotation stop test of 2000 to 5000 times, and some had difficulty in rotation.

EXAMPLE 11

Grooves having a shape such as that shown in FIG. 8 were formed on the outer peripheral surface of a shaft body material consisting of a silicon nitride body of 9 mm in diameter and 0.1 $\mu$m in out-of-roundness. The grooves were formed in four portions circumferentially in equal distribution by performing grinding in a direction perpendicular to the axis while controlling the shapes of inclined parts (parts corresponding to inclined surfaces whose inclination angle is $\alpha$) on air current inlet sides and inclined parts (parts corresponding to inclined surfaces whose inclination angle is $\beta$) on outlet sides. The details of the groove shape of this sample are shown in sample 11-A in Table 9.

A bearing body was so combined that the mean value of a clearance was 3.2 $\mu$m with respect to the shaft body thus prepared, and a measurement test on rotational behavior similar to Example 1 was performed. Further, working similar to the above was performed by employing a YAG laser, and the whole groove parts were polished with emery paper for forming grooves on the shaft body. The details of the groove shape of this sample are shown in a sample 11-B in Table 9. Measurement of rotational behavior was performed similarly to the above. Measurement results of the rotational behavior thereof are shown in samples 11-A and 11-B in Table 10.

EXAMPLE 12

A sample 12-A having a groove shape shown in Table 13 was prepared by performing grinding on the same shaft body material as the sample of Example 1 twice in units of 4° and in a depth of cut of 6 $\mu$m. Further, a sample 12-B was prepared by working air current outlet sides with emery paper (#1200) in the grooves of this sample. Working similar to the above was performed also as to the sample 1-A, to prepare a sample 12-C. When the groove shapes were measured, the working depths of the parts worked with the emery paper were about 0.2 $\mu$m on the average, and the angles were about 12 degrees.

Hydrodynamic gas bearing structures were structured similarly to Example 1 by employing shaft bodies prepared in the aforementioned manner, and a measurement test on rotational behavior was performed. Table 14 shows measurement results of the rotational behavior.

The rotational anisotropy was remarkable in the samples 12-B and 12C, and it has been proved that formation of shallow concave parts on the air current outlet sides with the emery paper is extremely effective for reducing the mean value and the maximum value of the floating rotational frequency in clockwise rotation and reducing dispersion thereof.

In columns of "$d_2/d_1 < 0.3$" and "$W_1/W \leq 0.5$" in Table 13, marks "o" indicate satisfaction of the conditions and marks "X" indicate unsatisfaction of the conditions. In the column remarks of Table 14, grooving is shown by numerical values of depths of successively cut concave parts, and "+ emery paper" was put down in case of performing polishing with emery paper.

performing grinding in a depth of cut of 3 μm, and finally further rotating the same by 4° and performing grinding in the depth of cut of 3 μm again (such a working method is hereinafter described as grooving of 6-3(4°)-3(4°) μm).

When measuring the groove shape, portions between the respective worked grooves were slightly shallow due to the working in units of 4°. The maximum depth of a part of an average sample cut in 6 μm was 6.3 μm, and the maximum depth of a part cut in 3 μm was 3.2 μm. The deepest portion of the part whose depth of cut was 6 μm was the deepest part of the overall groove, and the circumferential distances a and b from this point to edges of the groove (shown in FIG. 1, i.e., central angles γa and γb) were 11° and 5° respectively. Here the depth means a deviation from a complete round.

Then, in a sample 13-B, grooving of 6-1(3°)-1(2°)-1(2°)-1(2°) μm was performed in place of performing the grooving

TABLE 13

| | | Groove Outline | | | Deep Part | | | Emery Paper Part | | | | |
| --- | --- | --- | --- | --- | --- | --- | --- | --- | --- | --- | --- | --- |
| | Effective | | | Groove | Maximum | Mean | Groove | Maximum | Mean | Depth | | |
| Sample Name | Bearing Length (mm) | Groove Number (number) | Depth W (Degree) | Width $W_1$ (Degree) | Depth $d_{max}$ (μm) | Depth $d_1$ (μm) | Width $W_2$ (Degree) | Depth (μm) | Depth $d_2$ (μm) | Ratio $d_2/d_1$ (μm) | $d_2/d_1$ <0.3 | $W_1/W$ ≦0.5 |
| 12-A | 20 | 3 | 12 | 12 | 6.5 | 5.6 | — | — | — | — | x | x |
| 12-B | 20 | 3 | 28 | 12 | 6.4 | 5.5 | 16 | 0.2 | 0.2 | 0.036 | o | o |
| 12-C | 20 | 3 | 30 | 17 | 6.4 | 4.7 | 13 | 0.2 | 0.2 | 0.043 | o | x |

TABLE 14

| | in High-Speed Rotation | | Floating Rotational Frequency (rpm) | | | | | |
| --- | --- | --- | --- | --- | --- | --- | --- | --- |
| | Presence/Absence of H/W | | Mean Value | | Maximum Value | | Correspondence | |
| Sample Name | Clockwise Rotation | Counterclockwise Rotation | Clockwise Rotation | Counterclockwise Rotation | Clockwise Rotation | Counterclockwise Rotation | to Present Invention | Remarks |
| 12-A | no | no | 860 | 910 | 2400 | 2600 | x | 6-6 |
| 12-B | no | no | 250 | 4500 | 360 | 6800 | o | 6-6 + Emery Paper |
| 12-C | no | no | 220 | 4700 | 300 | 7200 | o | 6-3-3 + Emery Paper, Deep Part in Two Stages | o: Present Invention
x: Comparative Example

EXAMPLE 13

In hydrodynamic gas bearing structures of 8 mm in diameter and 2.8 μm in mean value of the thicknesses of clearances having a bearing effective length L (see FIG. 9A and FIG. 9B) of 20 mm whose outer bearing bodies (made of silicon nitride sintered bodies, total weight: 50 g) rotated, vertical grooves described later were formed by three circumferentially at regular intervals on inner shaft bodies of silicon nitride sintered bodies, for investigating rotational behavior. The out-of-roundness values of the outer diameters of the shaft bodies and the inner diameters of the bearing bodies employed as the materials were 0.18 μm and 0.8 μm respectively. The bearing bodies were floated with permanent magnets with respect to the thrust direction. As to the sample number, 50 structures were prepared for each groove shape.

In a sample 13-A, the grooves were formed with a grindstone having a flat grinding surface by performing grinding once in a depth of cut of 6 μm in a direction parallel to the axis, thereafter rotating the structure by 4° and of 6-3(4°)-3(4°) μm similarly to the sample 13-A. In parts of 1 μm in depth of cut, working was performed four times while setting rotation angles at 2° and 3°, since the depth of connecting parts of worked grooves become extremely shallow when setting the rotation angle at 4° identically to the case of the sample 13-A. When measuring the sectional shape of the grooves, the maximum depth of an average sample was 6.2 μm, and circumferential distances a and b from the deepest portion to edges of the grooves were 11° and 5° respectively.

As comparative example, a sample 13-C similarly subjected to grooving of 6-6(2°)-3(4°)-3(2°) μim was prepared. Table 15 shows shape measurement results of these samples. As rotational behavior, presence/absence of occurrence of whirl (H/W) in high-speed rotation (rotational frequency: 25000 rpm) and rotational frequencies (floating rotational frequencies) in which the bearing bodies and the shaft bodies came into contact with each other when gradually (naturally) reducing the rotational frequencies from high-speed rotation were measured as to the respective ones of clockwise rotation (the case where air current inflow sides correspond to deep parts) and counterclockwise rotation.

Table 16 shows the outline of the measurement results, and Table 17 shows the distribution situations of the floating rotational frequencies.

No occurrence of whirl in high-speed rotation was observed in all samples, and there was no problem in high-speed rotational behavior.

As to the floating rotational frequencies, dispersion of the floating rotational frequencies in a prescribed rotational direction (clockwise rotation) was small and the ratios of samples having a possibility of causing wear in starting or stoppage of rotation were small in the samples 13-A and 13-B having circumferentially asymmetrical grooves corresponding to the present invention, as compared with the sample 13-C which is comparative example. As to the counterclockwise rotation, to the contrary, dispersion of the floating rotational frequencies was large and the mean values also increased following this. Particularly in clockwise rotation, the ratios of at least 1000 rpm were less than 0.10 in the samples 13-A and 13-B. Here the rotational frequency of 1000 rpm is a rotational frequency as to which it was proved that no wear takes place (in starting/stoppage) at a level below this rotational frequency even if rotating in a contact manner.

In case of comparing the samples 13-A and 13-B with each other, dispersion of the floating rotational frequency in clockwise rotation was smaller in the sample 13-B whose groove depth ratio ($d_2/d_1$) was small.

Thus, it has been clarified that an effect of controlling anisotropy of the rotational direction is high as the width ratio ($W_1/W$) of relatively deep parts in stepwise asymmetrical grooves is small and the depth ratio ($d_2/d_1$) is small, the possibility of causing wear reduces since dispersion of the floating rotational frequency is small, and the manufacturing yield of the shaft body improves as a result.

TABLE 15

| Sample Name | Effective Bearing Length (mm) | Groove Outline Groove Number (number) | Groove Outline Width W (Degree) | Angle to Groove End a (Degree) | Angle to Groove End b (Degree) | Width of Each Part Deep Part $W_1$ (Degree) | Width of Each Part Shallow Part $W_2$ (Degree) | Width Ratio $W_1/W$ | Maximum Depth Deep Part ($\mu$m) | Maximum Depth Shallow Part ($\mu$m) | Mean Depth Deep Part $d_1$ ($\mu$m) | Mean Depth Shallow Part $d_2$ ($\mu$m) | Depth Ratio $d_2/d_1$ ($\mu$m) | Correspondence to Present Invention | Remarks |
|---|---|---|---|---|---|---|---|---|---|---|---|---|---|---|---|
| 13-A | 20 | 3 | 16 | 11 | 5 | 6 | 10 | 0.375 | 6.3 | 3.2 | 5.2 | 2.7 | 0.519 | o | 6-3-3 |
| 13-B | 20 | 3 | 16 | 11 | 5 | 6 | 10 | 0.375 | 6.2 | 1.2 | 5.1 | 1.0 | 0.196 | o | 6-1-1-1-1 |
| 13-C | 20 | 3 | 16 | 9 | 7 | 9 | 7 | 0.563 | 6.3 | 3.3 | 5.4 | 2.7 | 0.500 | x | 6-6-3-3 |
| 14-A | 20 | 3 | 16 | 12 | 4 | 4 | 12 | 0.250 | 6.6 | 1.3 | 5.3 | 1.0 | 0.189 | o | 6-1 (Laser) | o: Present Invention
x: Comparative Example

TABLE 16

| Sample Name | in High Speed Rotation Presence/Absence of H/W Clockwise Rotation | in High Speed Rotation Presence/Absence of H/W Counterclockwise Rotation | Floating Rotational Frequency (rpm) Mean Value Clockwise Rotation | Floating Rotational Frequency (rpm) Mean Value Counterclockwise Rotation | Floating Rotational Frequency (rpm) Maximum Value Clockwise Rotation | Floating Rotational Frequency (rpm) Maximum Value Counterclockwise Rotation | Remarks |
|---|---|---|---|---|---|---|---|
| 13-A | no | no | 530 | 1840 | 3500 | 6600 | |
| 13-B | no | no | 390 | 2240 | 1900 | 7100 | |
| 13-C | no | no | 710 | 1310 | 3700 | 6500 | |
| 14-A | no | no | 330 | 2140 | 1350 | 6400 | |

TABLE 17

| Sample Name | At Least to Less Than | 0~200 (rpm) | 200~300 (rpm) | 300~500 (rpm) | 500~1000 (rpm) | 1000~3000 (rpm) | 3000~5000 (rpm) | 5000~ (rpm) | Ratio of At Least 1000 (rpm) |
|---|---|---|---|---|---|---|---|---|---|
| 13-A | Clockwise Rotation | 8 | 18 | 10 | 10 | 3 | 1 | 0 | 0.08 |
| | Counterclockwise Rotation | 2 | 5 | 8 | 13 | 9 | 8 | 5 | 0.44 |
| 13-B | Clockwise Rotation | 10 | 21 | 9 | 8 | 2 | 0 | 0 | 0.04 |

TABLE 17-continued

| Sample Name | At Least to Less Than | 0~200 (rpm) | 200~300 (rpm) | 300~500 (rpm) | 500~1000 (rpm) | 1000~3000 (rpm) | 3000~5000 (rpm) | 5000~ (rpm) | Ratio of At Least 1000 (rpm) |
|---|---|---|---|---|---|---|---|---|---|
| | Counterclockwise Rotation | 0 | 5 | 5 | 10 | 14 | 10 | 6 | 0.60 |
| 13-C | Clockwise Rotation | 2 | 17 | 11 | 13 | 5 | 2 | 0 | 0.14 |
| | Counterclockwise Rotation | 1 | 10 | 12 | 11 | 9 | 4 | 3 | 0.32 |
| 14-A | Clockwise Rotation | 13 | 21 | 8 | 7 | 1 | 0 | 0 | 0.02 |
| | Counterclockwise Rotation | 1 | 6 | 5 | 8 | 15 | 9 | 6 | 0.60 |

EXAMPLE 14

Removal working of the outer peripheral surface of a shaft body was so performed that the depth was 6 $\mu$m and the width was 3 $\mu$m as relatively deep parts of grooves and the depth was 1 $\mu$m and the width was 11 $\mu$m as shallow parts following the same, by employing an excimer laser in place of employing a grinding stone in Example 1. Then, the grooved parts were wiped with cloth and thereafter cleaned with an ultrasonic cleaning apparatus for one hour to remove deposits, thereby preparing a sample 14-A. This sample was employed to measure the shape of the grooves similarly to Example 13, for investigating rotational behavior. Table 15, Table 16 and Table 17 show results thereof.

The sample 14-A exhibited rotational anisotropy equivalent to or slightly stronger than that of the sample 13-B.

EXAMPLE 15

Grooving was performed similarly to Example 13 except that working accuracy was improved so that the out-of-roundness of the outer diameter of a shaft body was 0.10 $\mu$m in Example 13 for performing shape measurement of grooves and measurement of rotational behavior. The respective grooving methods for the samples 13-A, 13-B and 13-C correspond to samples 15-A, 15-B and 15-C. Table 18 shows measurement results of the groove shapes, Table 19 shows measurement results of the rotational behavior and Table 20 shows measurement results of distribution of floating rotational frequencies.

Functions/effects by grooves having circumferentially asymmetrical sectional shapes became clearer than those in Example 13 due to improvement of the working accuracy of the shaft bodies, and such a ratio that the floating rotational frequency is in excess of 1000 rpm generating abrasion powder in a prescribed rotational direction (clockwise rotation) sharply reduced in every sample. Particularly in the samples 15-A and 15-B corresponding to the present invention, no such phenomenon that the floating rotational frequency exceeded 1000 rpm was observed.

TABLE 18

| | | Groove Outline | | Angle to Groove End | | Width of Each Part | | | Maximum Depth | | Mean Depth | | | Corres- pondence to Present Invention | Out-of- Roundness of Shaft Body ($\mu$m) | Remarks |
|---|---|---|---|---|---|---|---|---|---|---|---|---|---|---|---|---|
| | | | | | | Deep Part | Shallow Part | | Deep Part | Shallow Part | Deep Part | Shallow Part | | | | |
| Sample Name | Effective Bearing Length (mm) | Groove Number (Number) | W (Degree) | a (Degree) | b (Degree) | $W_1$ (Degree) | $W_2$ (Degree) | Width Ratio $W_1/W$ | Deep Part ($\mu$m) | Shallow Part ($\mu$m) | $d_1$ ($\mu$m) | $d_2$ ($\mu$m) | Ratio $d_2/d_1$ ($\mu$m) | | | |
| 15-A | 20 | 3 | 16 | 11 | 5 | 6 | 10 | 0.375 | 6.3 | 3.2 | 5.2 | 2.7 | 0.519 | o | 0.10 | 6-3-3 |
| 15-B | 20 | 3 | 16 | 11 | 5 | 6 | 10 | 0.375 | 6.2 | 1.1 | 5.1 | 0.9 | 0.176 | o | 0.10 | 6-1-1-1-1 |
| 15-C | 20 | 3 | 16 | 9 | 7 | 9 | 7 | 0.563 | 6.2 | 3.2 | 5.3 | 2.6 | 0.491 | x | 0.10 | 6-6-3-3 |
| 16-A | 20 | 3 | 16 | 11 | 5 | 6 | 10 | 0.375 | 6.2 | 3.2 | 5.2 | 2.7 | 0.519 | o | 0.30 | 6-3-3 |
| 16-B | 20 | 3 | 16 | 11 | 5 | 6 | 10 | 0.375 | 6.2 | 1.2 | 5.1 | 1.0 | 0.196 | o | 0.30 | 6-1-1-1-1 |
| 16-C | 20 | 3 | 16 | 9 | 7 | 9 | 7 | 0.563 | 6.1 | 3.3 | 5.2 | 2.6 | 0.500 | x | 0.30 | 6-6-3-3 | o: Present Invention
x: Comparative Example

TABLE 19

| Sample Name | in High-Speed Rotation Presence/Absence of H/W Clockwise Rotation | in High-Speed Rotation Presence/Absence of H/W Counterclockwise Rotation | Floating Rotational Frequency Mean Value Clockwise Rotation (rpm) | Floating Rotational Frequency Mean Value Counterclockwise Rotation (rpm) | Floating Rotational Frequency Maximum Value Clockwise Rotation (rpm) | Floating Rotational Frequency Maximum Value Counterclockwise Rotation (rpm) | Remarks |
|---|---|---|---|---|---|---|---|
| 15-A | no | no | 330 | 2260 | 900 | 6500 | |
| 15-B | no | no | 300 | 2660 | 780 | 7200 | |
| 15-C | no | no | 440 | 1720 | 1900 | 6200 | |
| 16-A | no | no | 770 | 1490 | 4800 | 7000 | |
| 16-B | no | no | 520 | 1740 | 2800 | 6700 | |
| 16-C | no | no | 970 | 1230 | 5000 | 6900 | |

TABLE 20

| Sample Name | At Least to Less Than | 0–200 (rpm) | 200–300 (rpm) | 300–500 (rpm) | 500–1000 (rpm) | 1000–3000 (rpm) | 3000–5000 (rpm) | 5000– (rpm) | Ratio of At Least 1000 (rpm) |
|---|---|---|---|---|---|---|---|---|---|
| 15-A | Clockwise Rotation | 8 | 23 | 11 | 8 | 0 | 0 | 0 | 0 |
| | Counterclockwise Rotation | 0 | 1 | 5 | 12 | 16 | 11 | 5 | 0.64 |
| 15-B | Clockwise Rotation | 12 | 23 | 9 | 6 | 0 | 0 | 0 | 0 |
| | Counterclockwise Rotation | 0 | 1 | 3 | 9 | 17 | 13 | 7 | 0.74 |
| 15-C | Clockwise Rotation | 3 | 22 | 12 | 11 | 2 | 0 | 0 | 0.04 |
| | Counterclockwise Rotation | 0 | 9 | 9 | 7 | 15 | 6 | 4 | 0.50 |
| 16-A | Clockwise Rotation | 4 | 17 | 8 | 14 | 5 | 2 | 0 | 0.14 |
| | Counterclockwise Rotation | 1 | 4 | 8 | 19 | 10 | 5 | 3 | 0.36 |
| 16-B | Clockwise Rotation | 7 | 19 | 7 | 13 | 4 | 0 | 0 | 0.08 |
| | Counterclockwise Rotation | 0 | 5 | 7 | 15 | 12 | 7 | 4 | 0.46 |
| 16-C | Clockwise Rotation | 1 | 17 | 8 | 11 | 9 | 4 | 0 | 0.26 |
| | Counterclockwise Rotation | 0 | 14 | 11 | 9 | 11 | 3 | 2 | 0.32 |

EXAMPLE 16

Grooving was performed similarly to Example 13 except that the out-of-roundness of the outer diameter of a shaft body was reduced to 0.30 $\mu$m in Example 13 for performing shape measurement of grooves and measurement of rotational behavior. The respective grooving methods for the samples 13-A, 13-B and 13-C correspond to samples 16-A, 16-B and 16-C. Table 18 shows measurement results of the groove shapes, Table 19 shows measurement results of the rotational behavior and Table 20 shows measurement results of distribution of floating rotational frequencies.

Anisotropy of the rotational direction became unclear as compared with Example 13 due to reduction of the working accuracy for the shaft bodies, i.e., the fact that the out-of-roundness increased (became worse), and such a ratio that the floating rotational frequency is in excess of 1000 rpm generating abrasion powder increased in a prescribed rotational direction (clockwise rotation) in every sample. However, it is understood that the ratios of samples whose floating rotational frequencies are in excess of 1000 rpm remain at relatively low values in the samples 16-A and 16-B corresponding to the present invention.

Embodiments and Examples disclosed in the above must be considered as being illustratively shown and not restrictive in all points. The scope of the present invention is shown not by the aforementioned embodiments or Examples but by the scope of claims, and includes all modifications and deformations within the meaning and range equivalent to the scope of claims.

Industrial Availability

According to the hydrodynamic gas bearing structures according to the first, second and third aspects of the present invention, as hereinabove described, such frequency that the floating rotational frequency in starting or stoppage of rotation is at least 1000 rpm can be reduced, the floating rotational frequency can be shifted toward a low rotational frequency side, a wear phenomenon in starting or stoppage of rotation can be further effectively prevented as a result, and the aforementioned effects can be exhibited even if the out-of-roundness is large (inferior). Therefore, the manufacturing yield of the shaft body can be further improved in manufacturing of the hydrodynamic gas bearing structure. Thus, the hydrodynamic gas bearing structure of the present invention is suitable for employment for a rotation driving part of a magnetic recording apparatus or a laser beam printer.

What is claimed is:

1. A hydrodynamic gas bearing structure comprising a columnar shaft body (1) and a hollow cylindrical bearing body (2) being opposed to said shaft body (1) while keeping a clearance in the radial direction so that a substantially cylindrical clearance is formed by the outer peripheral surface of said shaft body (1) and the inner peripheral surface of said bearing body (2) when so arranging said shaft body (1) and said bearing body (2) that the central axes of the respective ones coincide with each other and said shaft body (1) has a groove (11) extending in the axial direction on the outer peripheral surface, wherein said groove (11) has a circumferentially asymmetrical shape so that the circumferential distance a between an intersection point (15) of a line (C) connecting the deepest point (14) of said groove (11) and the center (O) of said shaft body and the outer peripheral line (Q) of said shaft body (1) before said groove (11) is formed and one edge (16) of said groove (11) positioned downstream an air current (P) generated when either said shaft body (1) or said bearing body (2) rotates in relation to said intersection point (15) becomes larger than the circumferential distance b between said intersection point (15) and the other edge (17) of said groove (11) positioned upstream said air current (P) in relation to said intersection point (15) in a cross section perpendicular to the axis, further, said groove (11) consists of at least two concave parts, whose depths substantially differ from each other, being formed serially in the circumferential direction of said shaft body (1), and the ratio ($d_2/d_1$) of the mean depth $d_2$ of a relatively shallow part of said groove (11) to the mean depth $d_1$ of a relatively deep part of said groove (11) is less than 0.3.

2. The hydrodynamic gas bearing structure in accordance with claim 1, wherein the ratio ($d_1/L$) of the mean depth $d_1$ of the relatively deep part of said groove (11) to the effective length L of said bearing body (2) is at least 0.00005 and not more than 0.002.

3. The hydrodynamic gas bearing structure in accordance with claim 1, wherein the ratio ($d_1/L$) of the mean depth $d_1$ of the relatively deep part of said groove (11) to the effective length L of said bearing body (2) is at least 0.00015 and not more than 0.0005.

4. The hydrodynamic gas bearing structure in accordance with claim 1, wherein the ratio of the mean value of the thickness of said clearance to the radius of said shaft body (1) is at least 0.00025 and not more than 0.002.

5. The hydrodynamic gas bearing structure in accordance with claim 1, wherein either said shaft body (1) or said bearing body (2) is prepared from ceramics.

6. The hydrodynamic gas bearing structure in accordance with claim 1, wherein either said shaft body (1) or said bearing body (2) is prepared from silicon nitride ceramics.

7. A method of manufacturing the hydrodynamic gas bearing structure in accordance with claim 1, wherein a step of forming said groove (11) comprises an operation of performing grinding on said shaft body (1) in the axial direction with a grinding wheel, thereafter rotating said shaft body (1) by a prescribed angle and performing grinding again, for forming the groove (11) having a prescribed shape.

8. A method of manufacturing a hydrodynamic gas bearing structure, wherein a step of forming said groove (11) includes an operation of grinding a part of the groove (11) of said shaft body (1) and the boundary portion between said groove (11) and the outer peripheral surface of said shaft body (1) with a grindstone after performing the step of forming the groove (11) in accordance with claim 7.

9. The method of manufacturing a hydrodynamic gas bearing structure in accordance with claim 7, performing grinding only a side downstream said air current (P) in the boundary portion between said groove (11) and the outer peripheral surface of said shaft body (1) with a grindstone.

10. A method of manufacturing the hydrodynamic gas bearing structure in accordance with claim 1, wherein a step of forming said groove (11) comprises a single unit step of performing grinding on said shaft body (1) in a direction parallel to or perpendicular to the axis with a grinding wheel while feeding a grinding table in the axial direction, and comprises an operation of rotating said shaft body (1) and repeating said single unit step for forming the groove (11) having a prescribed shape.

11. A method of manufacturing the hydrodynamic gas bearing structure in accordance with claim 1, for forming said groove (11) by removing a part of said shaft body (1) with a laser beam.

12. A hydrodynamic gas bearing structure comprising a columnar shaft body (1) and a hollow cylindrical bearing body (2) being opposed to this shaft body (1) while keeping a clearance in the radial direction so that a substantially cylindrical clearance is formed by the outer peripheral surface of said shaft body (1) and the inner peripheral surface of said bearing body (2) when so arranging said shaft body (1) and said bearing body (2) that the central axes of the respective ones coincide with each other and said shaft body (1) has a groove (11) extending in the axial direction on the outer peripheral surface, wherein said groove (11) has a circumferentially asymmetrical shape so that the circumferential distance a between an intersection point (15) of a line connecting the deepest point of said groove (11) and the center of said shaft body and the outer peripheral line of said shaft body (1) before said groove (11) is formed and one edge (16) of said groove (11) positioned downstream an air current (P) generated when either said shaft body (1) or said bearing body (2) rotates in relation to said intersection point (15) becomes larger than the circumferential distance b between said intersection point (15) and the other edge (17) of said groove (11) positioned upstream said air current (P) in relation to said intersection point (15) in a cross section perpendicular to the axis, further, said groove (11) consists of at least two concave parts, whose depths substantially differ from each other, being formed serially in the circumferential direction of said shaft body (1), and the ratio ($W_1/W$) of the width $W_1$ of a relatively deep part of said groove (11) along the circumferential direction to the width W of overall said groove (11) along the circumferential direction is not more than 0.5.

13. The hydrodynamic gas bearing structure in accordance with claim 12, wherein the ratio ($d_1/L$) of the mean depth $d_1$ of the relatively deep part of said groove (11) to the effective length L of said bearing body (2) is at least 0.00005 and not more than 0.002.

14. The hydrodynamic gas bearing structure in accordance with claim 12, wherein the ratio ($d_1/L$) of the mean depth $d_1$ of the relatively deep part of said groove (11) to the effective length L of said bearing body (2) is at least 0.00015 and not more than 0.0005.

15. The hydrodynamic gas bearing structure in accordance with claim 12, wherein the ratio of the mean value of the thickness of said clearance to the radius of said shaft body (1) is at least 0.00025 and not more than 0.002.

16. The hydrodynamic gas bearing structure in accordance with claim 12, wherein either said shaft body (1) or said bearing body (2) is prepared from ceramics.

17. The hydrodynamic gas bearing structure in accordance with claim 12, wherein either said shaft body (1) or said bearing body (2) is prepared from silicon nitride ceramics.

18. A method of manufacturing the hydrodynamic gas bearing structure in accordance with claim 12, wherein a step of forming said groove (11) comprises an operation of performing grinding on said shaft body (1) in the axial direction with a grinding wheel, thereafter rotating said shaft body (1) by a prescribed angle and performing grinding again, for forming the groove (11) having a prescribed shape.

19. A method of manufacturing a hydrodynamic gas bearing structure, wherein a step of forming said groove (11) includes an operation of grinding a part of the groove (11) of said shaft body (1) and the boundary portion between said groove (11) and the outer peripheral surface of said shaft body (1) with a grindstone after performing the step of forming the groove (11) in accordance with claim 18.

20. The method of manufacturing a hydrodynamic gas bearing structure in accordance with claim 18, performing grinding only a side downstream said air current (P) in the boundary portion between said groove (11) and the outer peripheral surface of said shaft body (1) with a grindstone.

21. A method of manufacturing the hydrodynamic gas bearing structure in accordance with claim 12, wherein a step of forming said groove (11) comprises a single unit step of performing grinding on said shaft body (1) in a direction parallel to or perpendicular to the axis with a grinding wheel while feeding a grinding table in the axial direction, and comprises an operation of rotating said shaft body (1) and repeating said single unit step for forming the groove (11) having a prescribed shape.

22. A method of manufacturing the hydrodynamic gas bearing structure in accordance with claim 12, for forming said groove (11) by removing a part of said shaft body (1) with a laser beam.

23. A hydrodynamic gas bearing structure comprising a columnar shaft body (1) and a hollow cylindrical bearing body (2) being opposed to this shaft body (1) while keeping a clearance in the radial direction so that a substantially cylindrical clearance is formed by the outer peripheral surface of said shaft body (1) and the inner peripheral surface of said bearing body (2) when so arranging said shaft body (1) and said bearing body (2) that the central axes of the respective ones coincide with each other and said shaft body (1) has a groove (11) extending in the axial direction on the outer peripheral surface, wherein said groove (11) has a circumferentially asymmetrical shape so that the circumferential distance a between an intersection point (15) of a line connecting the deepest point of said groove (11) and the center (0) of said shaft body and the outer peripheral line of said shaft body (1) before said groove (11) is formed and one edge (16) of said groove (11) positioned downstream an air current (P) generated when either said shaft body (1) or said bearing body (2) rotates in relation to said intersection point (15) becomes larger than the circumferential distance b between said intersection point (15) and the other edge (17) of said groove (11) positioned upstream said air current (P) in relation to said intersection point (15) in a cross section perpendicular to the axis, and further, said groove (11) has inclined surfaces whose inclination angles substantially differ from each other on both circumferential end portions of said shaft body (1).

24. The hydrodynamic gas bearing structure in accordance with claim 23, wherein the ratio ($W_3/W$) of the width $W_3$ of said inclined surface whose said inclination angle is relatively small along the circumferential direction to the width W of overall said groove (11) along the circumferential direction is at least 0.5.

25. The hydrodynamic gas bearing structure in accordance with claim 23, wherein the ratio ($d_{max}/L$) of the maximum depth $d_{max}$ of said groove (11) to the effective length L of said bearing body (2) is at least 0.00005 and not more than 0.001.

26. The hydrodynamic gas bearing structure in accordance with claim 23, wherein the ratio ($d_{max}/L$) of the maximum depth $d_{max}$ of said groove (11) to the effective length L of said bearing body (2) is at least 0.00015 and not more than 0.0005.

27. A method of manufacturing the hydrodynamic gas bearing structure in accordance with claim 23, for forming said groove (11) by removing a part of said shaft body (1) with a laser beam.

28. The hydrodynamic gas bearing structure in accordance with claim 23, wherein either said shaft body (1) or said bearing body (2) is prepared from ceramics.

29. The hydrodynamic gas bearing structure in accordance with claim 23, wherein the ratio of the mean value of the thickness of said clearance to the radius of said shaft body (1) is at least 0.00025 and not more than 0.002.

30. The hydrodynamic gas bearing structure in accordance with claim 23, wherein either said shaft body (1) or said bearing body (2) is prepared from silicon nitride ceramics.

31. A method of manufacturing the hydrodynamic gas bearing structure in accordance with claim 23, wherein a step of forming said groove (11) comprises a single unit step of performing grinding on said shaft body (1) in a direction parallel to or perpendicular to the axis with a grinding wheel while feeding a grinding table in the axial direction, and comprises an operation of rotating said shaft body (1) and repeating said single unit step for forming the groove (11) having a prescribed shape.

32. A method of manufacturing the hydrodynamic gas bearing structure in accordance with claim 23, wherein a step of forming said groove (11) comprises an operation of performing grinding on said shaft body (1) in the axial direction with a grinding wheel, thereafter rotating said shaft body (1) by a prescribed angle and performing grinding again, for forming the groove (11) having a prescribed shape.

33. A method of manufacturing a hydrodynamic gas bearing structure, wherein a step of forming said groove (11) includes an operation of grinding a part of the groove (11) of said shaft body (1) and the boundary portion between said groove (11) and the outer peripheral surface of said shaft body (1) with a grindstone after performing the step of forming the groove (11) in accordance with claim 32.

34. The method of manufacturing a hydrodynamic gas bearing structure in accordance with claim 32, performing grinding only a side downstream said air current (P) in the boundary portion between said groove (11) and the outer peripheral surface of said shaft body (1) with a grindstone.

* * * * *

UNITED STATES PATENT AND TRADEMARK OFFICE
CERTIFICATE OF CORRECTION

PATENT NO. : 6,082,900

DATED : July 4, 2000

INVENTOR(S) : Takeuchi et al.

It is certified that error appears in the above-identified patent and that said Letters Patent is hereby corrected as shown below:

Col. 15, line 42, after "behavior", replace "thereof The" by --thereof. The--;

Col. 20, Table 6, under the heading "Remarks", line 2, replace

"6-5.5 - 55" by --6-5.5 - 5.5--;

Col. 21, Table 8, under the heading "Counterclockwise Rotation (1$^{st}$. occurrence);

line 2, replace "nO" by --no--;

Col. 37, line 58, after "center", replace "(0)", by --(O)--.

Signed and Sealed this

Twenty-fourth Day of April, 2001

*Attest:*

NICHOLAS P. GODICI

*Attesting Officer*      *Acting Director of the United States Patent and Trademark Office*